US009019231B2

(12) United States Patent
Minami et al.

(10) Patent No.: US 9,019,231 B2
(45) Date of Patent: Apr. 28, 2015

(54) DISPLAY DEVICE WITH TOUCH DETECTION FUNCTION AND ELECTRONIC UNIT

(75) Inventors: Yuichiro Minami, Kanagawa (JP); Masahiro Minegishi, Kanagawa (JP); Koji Noguchi, Kanagawa (JP); Koji Ishizaki, Tokyo (JP); Yoshitoshi Kida, Kanagawa (JP); Kohei Azumi, Tokyo (JP)

(73) Assignee: Japan Display Inc., Tokyo (JP)

( * ) Notice: Subject to any disclaimer, the term of this patent is extended or adjusted under 35 U.S.C. 154(b) by 159 days.

(21) Appl. No.: 13/137,338

(22) Filed: Aug. 8, 2011

(65) Prior Publication Data
US 2012/0075238 A1 Mar. 29, 2012

(30) Foreign Application Priority Data

Sep. 28, 2010 (JP) ................. 2010-217579

(51) Int. Cl.
*G06F 3/045* (2006.01)
*G06F 3/044* (2006.01)
(52) U.S. Cl.
CPC ...................... *G06F 3/044* (2013.01)
(58) Field of Classification Search
USPC ................................ 345/173, 174
See application file for complete search history.

(56) References Cited

U.S. PATENT DOCUMENTS

| 5,314,291 A | 5/1994 | Ohashi et al. |
| 5,392,058 A | 2/1995 | Tagawa |
| 5,581,274 A | 12/1996 | Tagawa |
| 7,382,139 B2 | 6/2008 | Mackey |
| 2006/0097991 A1* | 5/2006 | Hotelling et al. ............. 345/173 |
| 2008/0218487 A1 | 9/2008 | Huang et al. |
| 2010/0007628 A1 | 1/2010 | Eriguchi et al. |
| 2010/0026660 A1 | 2/2010 | Kitamura |

(Continued)

FOREIGN PATENT DOCUMENTS

| JP | 04-337824 | 11/1992 |
| JP | 2008-086236 | 4/2008 |

(Continued)

OTHER PUBLICATIONS

Taiwanese Office Action issued Nov. 2, 2013 for corresponding Taiwanese Application No. 100127452.

(Continued)

*Primary Examiner* — Sahlu Okebato
(74) *Attorney, Agent, or Firm* — Rader, Fishman & Grauer PLLC

(57) ABSTRACT

A display device with a touch detection function includes a display function layer, a plurality of touch detection electrodes arranged side by side to extend in a first direction, and a plurality of drive electrodes arranged side by side to extend in a second direction, electrostatic capacitance being formed at intersections of the touch detection electrodes and the drive electrodes. The plurality of drive electrodes extends to a first position or a second position outside of the first position, the first position being away from a center of an outermost touch detection electrode by a half length of an arrangement pitch of the touch detection electrodes, the outermost touch detection electrode being defined as outermost one of touch detection electrodes included in an effective display region of the display function layer, and an outer edge of the effective display region is located on or inside the first position.

23 Claims, 20 Drawing Sheets

(56) References Cited

U.S. PATENT DOCUMENTS

| | | | |
|---|---|---|---|
| 2010/0182273 A1* | 7/2010 | Noguchi et al. | 345/174 |
| 2011/0134052 A1* | 6/2011 | Tsai et al. | 345/173 |
| 2012/0169401 A1* | 7/2012 | Hristov et al. | 327/517 |

FOREIGN PATENT DOCUMENTS

| | | |
|---|---|---|
| JP | 2008-217784 | 9/2008 |
| JP | 2009-244958 | 10/2009 |
| JP | 2010-020443 A | 1/2010 |
| JP | 2010-039602 A | 2/2010 |
| JP | 2010-086236 A | 4/2010 |
| TW | 201001010 A | 1/2010 |

OTHER PUBLICATIONS

Taiwanese Office Action issued Nov. 22, 2013 for corresponding Taiwanese Application No. 100127452.

Japanese Office Action issued Dec. 3, 2013 for corresponding Japanese Application No. 2010-217579.

* cited by examiner

DISPLAY DEVICE WITH TOUCH DETECTION FUNCTION AND ELECTRONIC UNIT

BACKGROUND

This disclosure relates to a display device with a touch detection function, and in particular, to a display device with a touch detection function detecting touch events based on a change of an electrostatic capacitance in response to an external proximity object, and an electronic unit including such a display device with a touch detection function.

In recent years, a display device capable of inputting information by mounting a contact detection device, which is a so-called touch panel, on a display device such as a liquid crystal display device, or integrating the touch panel and the display device, and displaying various button images and the like on the display device instead of typical mechanical buttons has attracted attention. The display device including such a touch panel does not require input devices such as a keyboard, a mouse, and a keypad, and therefore there is a tendency to expand the use of such a display device to portable information terminals such as mobile phones, in addition to computers.

In the touch detection method, some methods are included, and one of them is an electrostatic capacitance type. For example, in Japanese Unexamined Patent Application Publication No. 2009-244958 (JP-A-2009-244958), a display device in which a common electrode originally provided in the display device for display is also used as one electrode of a pair of touch sensor electrodes, and the other electrode (touch detection electrode) is arranged to intersect with the common electrode has been proposed. In addition, in Japanese Unexamined Patent Application Publication No. 2008-217784 (JP-A-2008-217784), a touch panel including a plurality of electrodes formed along X-axis direction and Y-axis direction has been proposed. Moreover, in U.S. Pat. No. 7,382,139, a sensor device including three electrodes with different widths depending on a position on one layer has been proposed. Further, in Japanese Unexamined Patent Application Publication No. 2010-86236 (JP-A-2010-86236), a touch panel which includes a plurality of electrodes formed along X-axis direction and Y-axis direction and an uneven region for preventing touch errors formed on an operation surface of the touch panel has been proposed. The touch panel is also configured to have a constant electrostatic capacitance even in a case where such an uneven region is provided.

SUMMARY

Generally, the touch detection device is desirably has uniform detection sensitivity in the touch detection surface. In the touch detection device of an electrostatic capacitance type, however, for example, detection sensitivity in an end region of the touch detection surface may be lower than the detection sensitivity in a center portion of the detection surface, and thus uniformity in the detection sensitivity is possibly lowered. However, in the display device described in JP-A-2009-244958, in the touch panel described in JP-A-2008-217784, and in the sensor device described in U.S. Pat. No. 7,382,139, description of uniformity in detection sensitivity has not been given. In addition, in the touch panel described in JP-A-2010-86236, detection sensitivity in the end region of the touch detection surface has not been mentioned.

It is desirable to provide a display device with a touch detection function and an electronic unit capable of improving uniformity in detection sensitivity with respect to touch events.

A display device with a touch detection function according to an embodiment of the disclosure includes a display function layer, a plurality of touch detection electrodes, and a plurality of drive electrodes. The plurality of touch detection electrodes are arranged side by side to extend in a first direction. The plurality of drive electrodes are arranged side by side to extend in a second direction intersecting with the first direction, electrostatic capacitance being formed at intersections of the touch detection electrodes and the drive electrodes. The plurality of drive electrodes extends to a first position or a second position outside of the first position, the first position is away from a center of an outermost touch detection electrode by a half length of an arrangement pitch of the touch detection electrodes, the outermost touch detection electrode being defined as outermost one of touch detection electrodes included in an effective display region of the display function layer, and an outer edge of the effective display region is located on or inside the first position.

An electronic unit according to an embodiment of the disclosure includes the above-described display device with a touch detection function, and for example, corresponds to a television device, a digital camera, a personal computer, a video camera, or a portable terminal device such as a mobile phone.

In the display device with a touch detection function and the electronic unit according to the embodiment of the disclosure, display is performed on the display function layer, and touch detection with respect to an external proximity object is performed based on a change of an electrostatic capacitance between the drive electrodes and the touch detection electrodes. The drive electrodes are formed to extend to the first position which is away from the center of the outermost touch detection electrode by a half length of the arrangement pitch in the effective display region, or to the second position outside of the first position, and lines of electric force of the outermost touch detection electrode are formed substantially the same as lines of electric force of the inner touch detection electrode. In addition, the outer edge of the effective display region is located on or inside the first position.

In the display device with a touch detection function according to the embodiment of the disclosure, for example, the plurality of drive electrodes may include one or more drive electrodes arranged side by side outside the effective display region in the first direction as well. In addition, for example, the plurality of touch detection electrodes may include one or more touch detection electrodes arranged side by side outside the effective display region in the second direction as well, and may extend to at least a third position located outside an outermost drive electrode.

For example, the plurality of touch detection electrodes may be formed to have a same electrode width, and an arrangement pitch of the touch detection electrodes in an outer region may be equal to or larger than that in an inner region, within the effective display region.

Moreover, for example, the plurality of touch detection electrodes may be arranged with a same arrangement pitch, and a width of touch detection electrode in an outer region may be equal to or smaller than that in an inner region, within the effective display region.

Furthermore, for example, the display device with a touch detection function according to the embodiment of the disclosure may further include an upper layer formed to cover at least the effective display region, and a thickness of the upper layer in an outer region in the second direction may be equal to or smaller than that in an inner region in the second direction.

Moreover, for example, the display function layer may include a liquid crystal display layer, a pixel electrode, and a common electrode. In this case, for example, the common electrodes may be used as the drive electrode, as well. For example, the common electrodes may be arranged on an opposite side of the pixel electrodes from the liquid crystal display layer, may be arranged between the liquid crystal display layer and the pixel electrodes, or may be arranged on an opposite side of the liquid crystal display layer from the pixel electrode.

In the display device with a touch detection function and the electronic unit according to the embodiment of the disclosure, the drive electrodes extend to the first position or the second position outside thereof, and the outer edge of the effective display region is located on or inside the first position. Therefore, the detection sensitivity in a region corresponding to the outermost touch detection electrode is allowed to be equal to the detection sensitivity in a region corresponding to the inner touch detection electrode, and thus the uniformity in the detection sensitivity may be improved in the effective display region.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 26 is a sectional view illustrating a schematic cross-sectional configuration of a display section with a touch detection function according to a modification of each of the embodiments and the like.

DETAILED DESCRIPTION

Hereinafter, preferred embodiments of the disclosure will be described in detail with reference to drawings. Incidentally, the description will be given in the following order.

1. Basic principle of electrostatic capacitance type touch detection
2. First embodiment (display device with touch detection function)
3. Second embodiment (display device with touch detection function)
4. Third embodiment (display device with touch detection function)
5. Fourth embodiment (display device with touch detection function)
6. Fifth embodiment (touch detection device)
7. Sixth embodiment (touch detection device)
8. Seventh embodiment (touch detection device)
9. Application examples

1. Basic Principle of Electrostatic Capacitance Type Touch Detection

First, a basic principle of touch detection in a display device with a touch detection function according to embodiments of the disclosure will be described with reference to FIG. 1 to FIG. 3. The touch detection method is implemented as an electrostatic capacitance type touch sensor, and a capacitance element is configured with use of a pair of electrodes (a drive electrode E1 and a touch detection electrode E2) facing to each other with a dielectric body D in between as illustrated in (A) of FIG. 1, for example. The configuration is represented as an equivalent circuit illustrated in (B) of FIG. 1. A capacitance element C1 is configured of the drive electrode E1, the touch detection electrode E2, and the dielectric body D. One end of the capacitance element C1 is connected to an alternating signal source (a drive signal source) S, and the other end P is grounded through a resistor R and is connected to a voltage detector (a touch detection circuit) DET. When an alternating rectangular wave Sg ((B) of FIG. 3) with a predetermined frequency (for example, several kHz to several tens kHz) is applied to the drive electrode E1 (one end of the capacitance element C1) from the alternating signal source S, an output waveform (a touch detection signal Vdet) as illustrated in (A) of FIG. 3 appears in the touch detection electrode E2 (the other end P of the capacitance element C1). Note that the alternating rectangular wave Sg corresponds to a drive signal Vcom described later.

Figure 1:
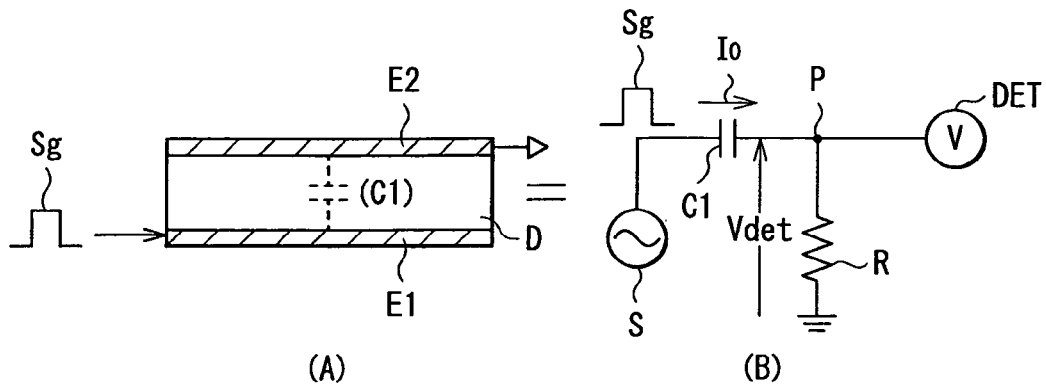
FIG. 1 is a diagram for describing a basic principle of a touch detection method in a display device with a touch detection function according to embodiments of the disclosure, and a diagram illustrating a state where a finger is not in contact with or not in proximity to the display device.

For example, in a state where a finger is not in contact with (or not in proximity to) the display device, as illustrated in FIG. 1, a current I0 according to the capacitance value of the capacitance element C1 flows in response to charge and discharge with respect to the capacitance element C1. The other end P of the capacitance element C1 at this time has a potential waveform like a waveform V0 in (A) of FIG. 3, and the waveform is detected by the voltage detector DET.

Figure 2:
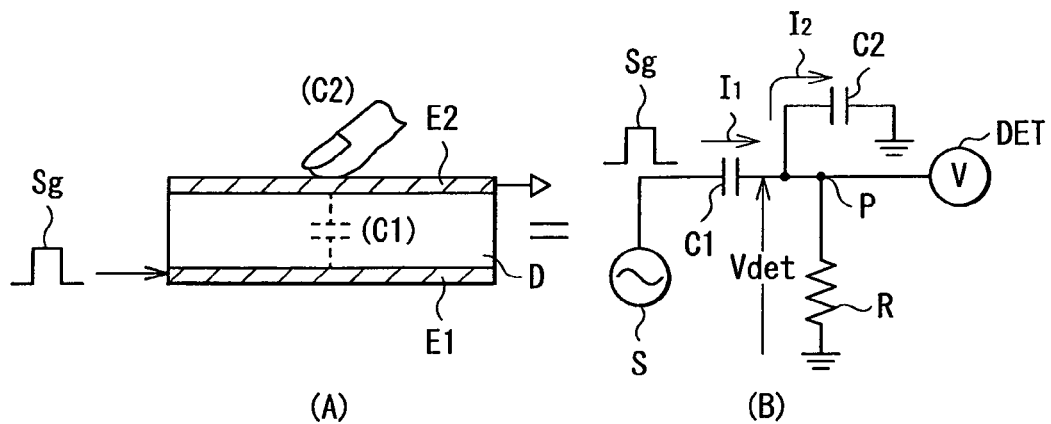
FIG. 2 is a diagram for describing the basic principle of the touch detection method in the display device with a touch detection function according to the embodiments of the disclosure, and a diagram illustrating a state where a finger is in contact with or in proximity to the display device.
Figure 3:
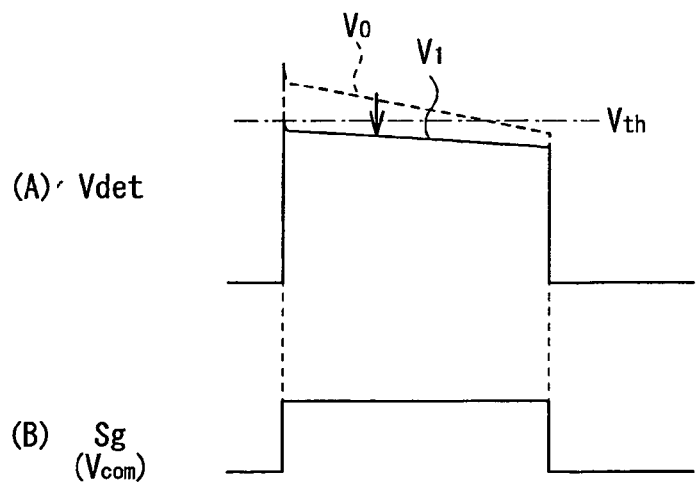
FIG. 3 is a diagram for describing the basic principle of the touch detection method in the display device with a touch detection function according to the embodiments of the disclosure, and a diagram illustrating an example of waveforms of a drive signal and a touch detection signal.

On the other hand, in a state where a finger is in contact with (or in proximity to) the display device, as illustrated in FIG. 2, a capacitance element C2 formed by the finger is added in series to the capacitance element C1. In this state, currents I1 and I2 flow in response to charge and discharge with respect to the capacitance elements C1 and C2, respectively. The other end P of the capacitance element C1 at this time has a potential waveform like a waveform V1 in (A) of FIG. 3, and the waveform is detected by the voltage detector DET. At this time, the potential of the point P is a partial potential determined by values of the currents I1 and I2 flowing through the capacitance elements C1 and C2. Therefore, the waveform V1 is a smaller value than that of the waveform V0 in a non-contact state. The voltage detector DET compares the detected voltage with a predetermined threshold voltage Vth to determine the non-contact state when the detected voltage is equal to or larger than the threshold voltage, and to determine a contact state when the detected voltage is smaller than the threshold voltage. In such a way, touch detection is achievable. In this example, contact of a finger is described as an example. However, this is not limitative, and for example, a stylus may be used.

2. First Embodiment

Configuration Example

General Configuration Example

Figure 4:
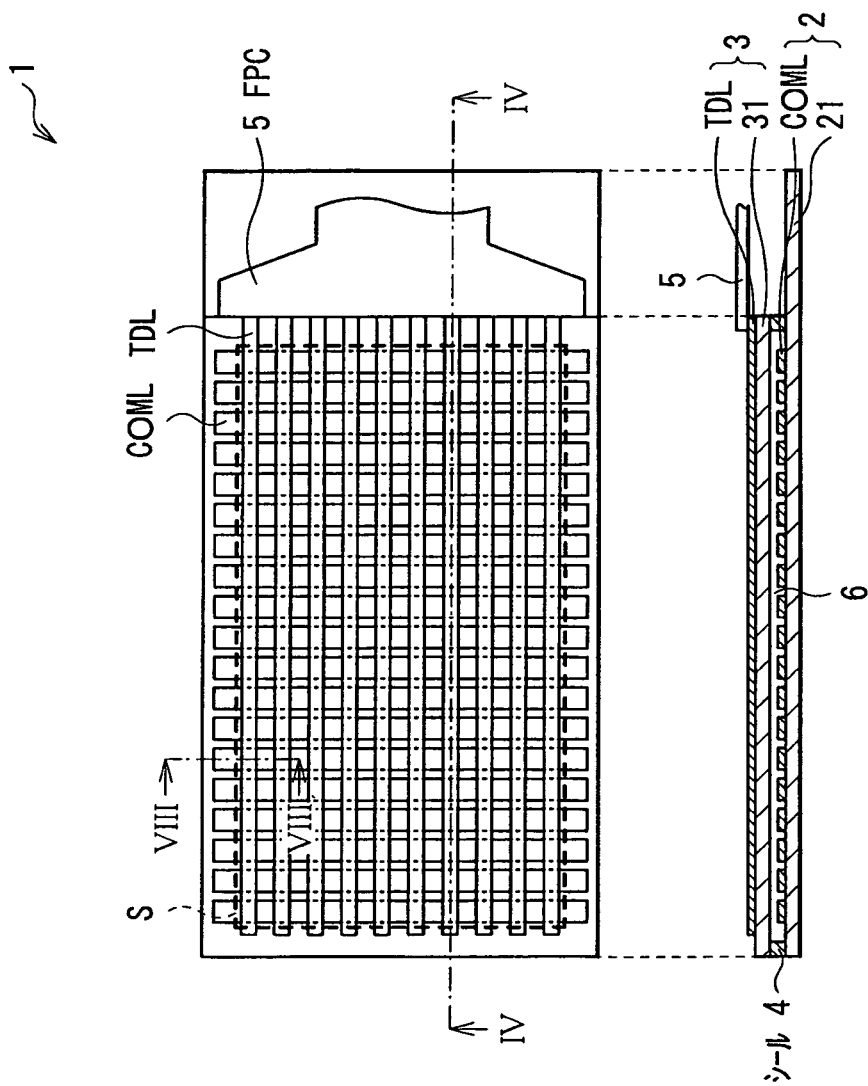
FIG. 4 is a plane view and a sectional view illustrating a configuration example of a display device with a touch detection function according to a first embodiment of the disclosure.
Figure 5:
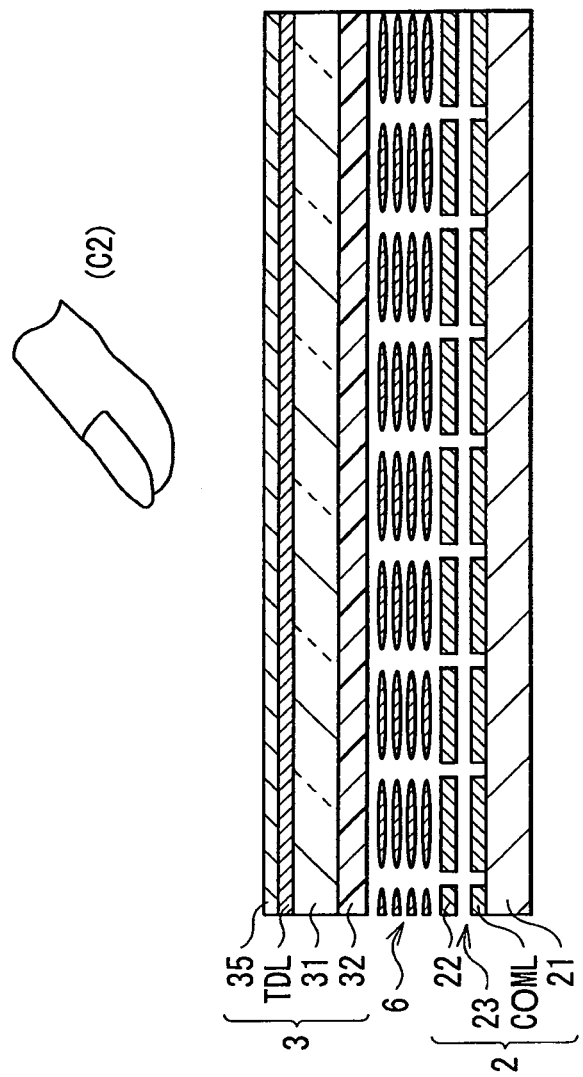
FIG. 5 is a sectional view illustrating a schematic cross-sectional configuration of the display device with a touch detection function illustrated in FIG. 4.

FIG. 4 illustrates a configuration example of a display device with a touch detection function according to a first embodiment of the disclosure, and FIG. 5 illustrates an example of a cross-sectional configuration of a relevant part of FIG. 4. The display device with a touch detection function uses a liquid crystal display element as a display element, and is of a so-called in-cell type in which a liquid crystal display section configured of the liquid crystal display element and an electrostatic capacitance type touch detection section are integrated.

A display device with a touch detection function 1 includes a pixel substrate 2, a facing substrate 3 disposed to face the pixel substrate 2, and a liquid crystal layer 6 inserted between the pixel substrate 2 and the facing substrate 3.

The pixel substrate 2 includes a TFT substrate 21 as a circuit substrate, common electrodes COML, and pixel substrates 22 as illustrated in FIG. 5. The TFT substrate 21 functions as a circuit substrate provided with various kinds of electrodes, wirings, thin film transistors (TFTs), and the like. The TFT substrate 21 is made of, for example, a glass. The common electrodes COML are formed on the TFT substrate 21. The common electrodes COML are electrodes for supplying a common voltage to a plurality of pixels Pix (described later) and have translucency. In addition, the common electrodes COML are also used as electrodes applying an alternating rectangular wave Sg in a touch sensor. In other words, the common electrodes COML correspond to the drive electrode E1 in the above-described basic principle of the electrostatic capacitance type touch detection. As illustrated in FIG. 4, the common electrodes COML are arranged side by side to extend in one direction throughout an effective display region S in which the display device with a touch detection function 1 performs display. Each of the common electrodes COML is formed to extend to the outside of the effective display region S. An insulating layer 23 is formed on the common electrodes COML, and the pixel electrodes 22 are formed on the insulating layer 23. The pixel electrodes 22 are electrodes for supplying a pixel signal for display, and have translucency. Each of the common electrodes COML and the pixel electrodes 22 is made of, for example, ITO (indium tin oxide).

As illustrated in FIG. 5, the facing substrate 3 includes a glass substrate 31, a color filter 32, and touch detection electrodes TDL. The color filter 32 is formed on a surface of the glass substrate 31. The color filter 32 is configured by, for example, cyclically arranging three color filter layers of red (R), green (G), and blue (B), and a set of three colors of R, G, and B corresponds to each display pixel. In addition, on the other surface of the glass substrate 31, the touch detection electrodes TDL are arranged side by side to extend in a direction intersecting with the common electrodes COML throughout the effective display region S. The touch detection electrodes TDL are electrodes each outputting a touch detection signal Vdet in a touch sensor. In other words, the touch detection electrodes TDL correspond to the touch detection electrode E2 in the above-described basic principle of the electrostatic capacitance type touch detection. Each of the touch detection electrodes TDL is made of, for example, ITO, and has translucency. The touch detection electrodes TDL are connected to a flexible printed circuit board (FPC) 5 for outputting the touch detection signal Vdet to the outside. A polarizing plate 35 is disposed on the touch detection electrodes TDL, and a surface glass plate (not illustrated) is disposed on the polarizing plate 35.

The liquid crystal layer 6 functions as a display function layer, and modulates light passing therethrough depending on a state of an electric field. The electric field is formed by a potential difference between a voltage of the common electrodes COML and a voltage of the pixel electrodes 22. A liquid crystal in a lateral-electric-field mode such as FFS (fringe field switching) and IPS (in-plane switching) is used as the liquid crystal layer 6. The liquid crystal layer 6 is sealed between the pixel substrate 2 and the facing substrate 3 by a seal 4.

Although illustration is omitted, an alignment film is disposed between the liquid crystal layer 6 and the pixel substrate 2 and between the liquid crystal layer 6 and the facing substrate 3, and an incident-side polarizing plate is disposed on a bottom surface side of the pixel substrate 2.

Figure 6:
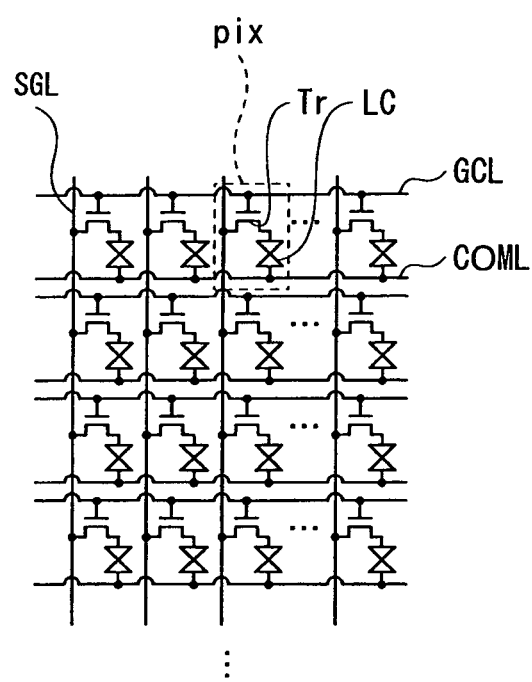
FIG. 6 is a circuit diagram illustrating a pixel arrangement of the display device with a touch detection function illustrated in FIG. 4.

FIG. 6 illustrates a configuration example of a pixel structure in the display device with a touch detection function 1. The display device with a touch detection function 1 includes a plurality of pixels Pix arranged in a matrix. Each of the pixels Pix has a TFT element Tr and a liquid crystal element LC. The TFT element Tr is configured of a thin film transistor, and in the example, is configured of an n-channel MOS (metal oxide semiconductor) TFT. A source of the TFT element Tr is connected to a pixel signal line SGL, a gate thereof is connected to a scan signal line GCL, and a drain thereof is connected to one end of the liquid crystal element LC. One end of the liquid crystal element LC is connected to the drain of the TFT element Tr, and the other end thereof is connected to the common electrode COML.

Each of the pixels Pix is connected mutually, through the scan signal line GCL, to the other pixels Pix which are in the same row of the display device with a touch detection function 1. In addition, each of the pixels Pix is connected mutually, through the pixel signal line SGL, to the other pixels Pix which are in the same column of the display device with a touch detection function 1. Moreover, each of the pixels Pix is connected mutually, through the common electrode COML, to the other pixels Pix which are in the same row of the display device with a touch detection function 1.

Figure 7:
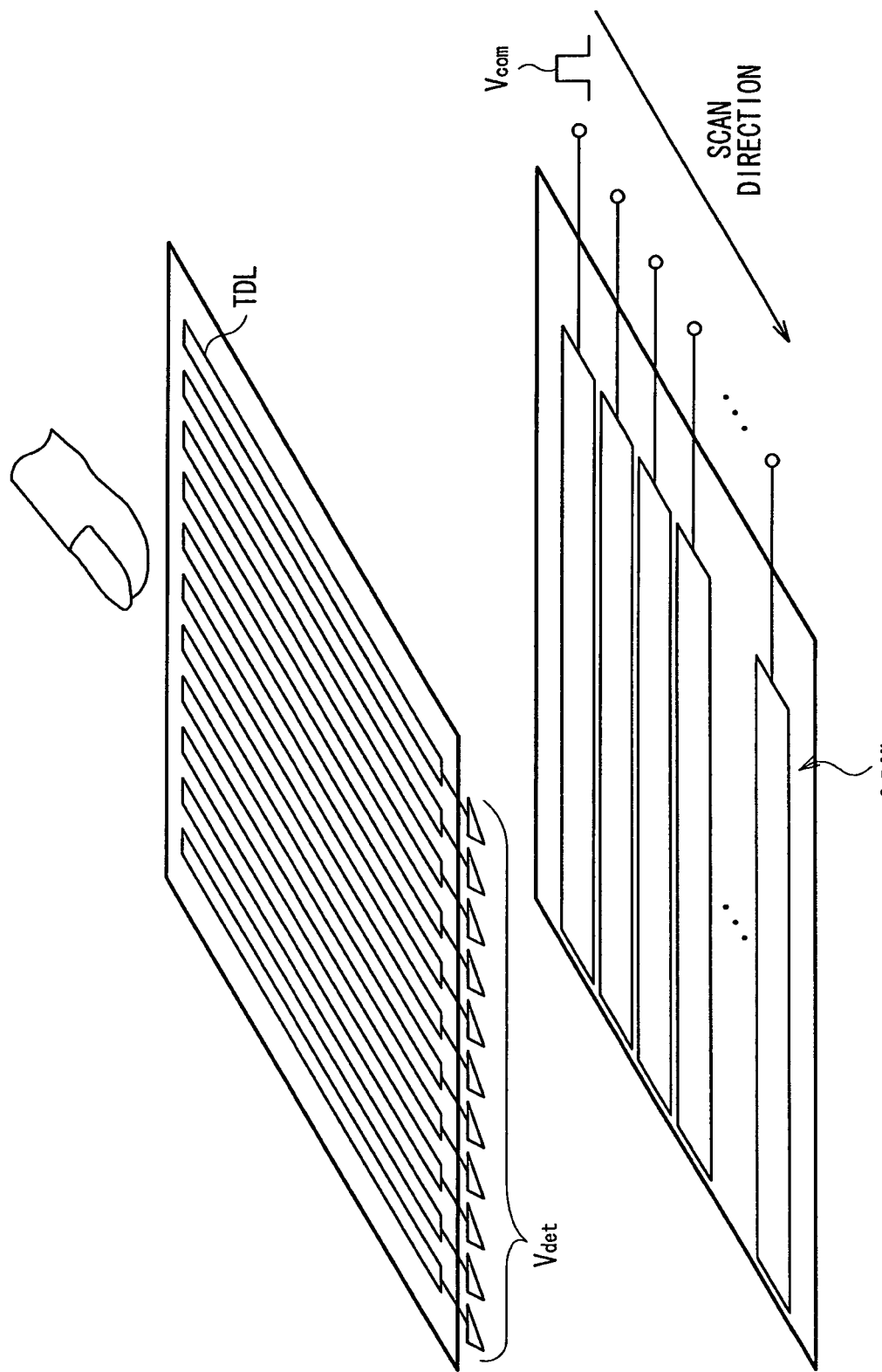
FIG. 7 is a perspective view illustrating a configuration example of common electrodes and touch detection electrodes of the display device with a touch detection function illustrated in FIG. 5.

FIG. 7 is a perspective view illustrating a configuration example of a touch sensor in the display device with a touch detection function 1. The touch sensor is configured of the common electrodes COML arranged on the pixel substrate 2 and the touch detection electrodes TDL arranged on the facing substrate 3. Each of the common electrodes COML is configured of a stripe-shaped electrode pattern extending in a lateral direction of the figure. When touch detection operation is performed, the drive signal Vcom (corresponding to the alternating rectangular wave Sg in the above-described basic principle of the electrostatic capacitance type touch detection) is sequentially supplied to each of the electrode patterns, and sequential scan drive is performed in a time-divisional manner. Each of the touch detection electrodes TDL is configured of an electrode pattern extending in a direction intersecting with an extending direction of the electrode pattern of each of the common electrodes COML. The electrode patterns of the drive electrode COML and the electrode patterns of the touch detection electrodes TDL intersecting with each other form an electrostatic capacitance at each intersection. Each electrode pattern of the touch detection electrodes TDL is connected to a touch detection circuit (not illustrated) through the FPC 5, and touch detection is performed based on the touch detection signal Vdet supplied from the touch detection electrodes TDL.

The touch sensor illustrated in FIG. 7 operates in accordance with the above-described basic principle of the touch detection. In other words, the common electrodes COML and the touch detection electrodes TDL correspond to the drive electrode E1 and the touch detection electrode E2 in the above-described basic principle of the touch detection, respectively. As illustrated in FIG. 7, the electrode patterns intersecting with each other configure electrostatic capacitance type touch sensor elements in a matrix. Therefore, scan is performed throughout the entire touch detection surface of the display device with a touch detection function 1 so that a contact position or a proximal position of the external proximity object is detectable.

Here, the liquid crystal layer 6, the common electrodes COML, and the pixel electrodes 22 correspond to a specific example of "a display function layer" of the disclosure. The common electrodes COML correspond to a specific example of "drive electrodes" of the disclosure.

[Functions and Effects]

Subsequently, functions and effects of the display device with a touch detection function 1 of the embodiment will be described.

First, general operation outline of the display device with a touch detection function 1 will be described with reference to FIG. 4 to FIG. 7. In display operation, based on a signal supplied to the pixel electrodes 22 and the common electrodes COML, an electric field is formed in the liquid crystal layer 6, then liquid crystal molecules in the liquid crystal layer 6 are changed in orientation, and thus light passing therethrough is modulated to perform display. In touch detection operation, the drive signal Vcom is sequentially supplied to the common electrodes COML, and is then transmitted to the touch detection electrodes TDL through the electrostatic capacitances between the common electrodes COML and the touch detection electrodes TDL to be output as the touch detection signal Vdet. Then, the touch detection signal Vdet is supplied to the outside (for example, the touch detection circuit) through the FPC 5, and accordingly the presence of the touch events or a touched position is detected.

As illustrated in FIG. 4, the common electrodes COML are formed to extend to the outside of the effective display region S. Therefore, in the display device with a touch detection function 1, detection sensitivity at end portions of the effective display region S is allowed to be equal to detection sensitivity at a center portion of the effective display region S. As a result, uniformity in the detection sensitivity with respect to touch events in the effective display region S may be improved. The detail thereof will be described below.

Figure 8:
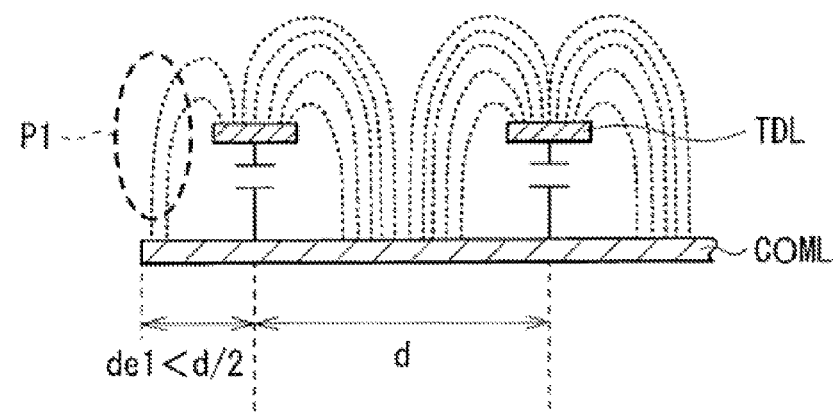
FIGS. 8 and 27 are schematic diagrams illustrating lines of electric force due to fringes, between the common electrodes and the touch detection electrodes.
Figure 27:
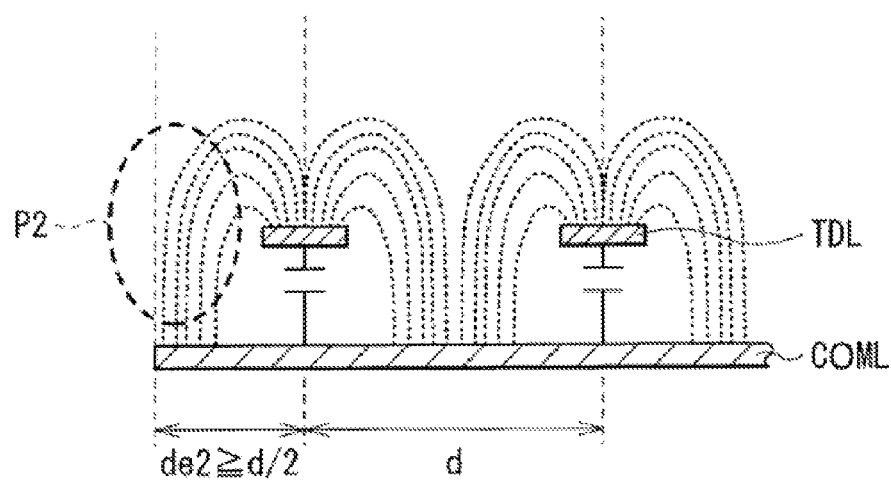

FIGS. 8 and 27 schematically illustrate lines of electric force due to fringes, between the common electrodes COML and the touch detection electrodes TDL, where FIG. 8 illustrates an example (a comparative example) of a case where the common electrodes COML are short, and FIG. 27 illustrates an example (an example of the embodiment) of a case where the common electrodes COML are long. FIGS. 8 and 27 illustrate a sectional view of the display device with a touch detection function 1 in the direction of an arrow VIII-VIII in FIG. 4.

In the example of FIG. 8 according to the comparative example, the common electrode COML further extends from a center of an outermost touch detection electrode TDL (the touch detection electrode TDL on the left in FIG. 8) by a length de1 (<d/2) corresponding to a length less than half of a distance between the center of the outermost touch detection electrode and a center of a touch detection electrode adjacent thereto. On the other hand, in the example of FIG. 27 according to the embodiment, the common electrode COML further extends from the center of the outermost touch detection electrode TDL by a length de2 (≥d/2) corresponding to a length equal to more than half of the electrode pitch d.

In FIG. 8 according to the comparative example, since the common electrode COML is short, the lines of electric force of the outermost touch detection electrode TDL due to fringes are reduced on the outside (in a portion P1). In other words, the number of the lines of electric force of the outermost touch detection electrode TDL due to fringes becomes smaller than that of the lines of electric force of the other touch detection electrodes TDL. Accordingly, the detection sensitivity in a region corresponding to the outermost touch detection electrode TDL is lower than that in regions corresponding to the other touch detection electrodes TDL.

On the other hand, in FIG. 27 according to the embodiment, the common electrode COML is lengthened to suppress decrease of the lines of electric force of the outermost touch detection electrode TDL due to fringes to the minimum (in a portion P2). Therefore, the number of the lines of electric force of the outermost touch detection electrode TDL due to fringes may be equal to that of the lines of electric force of each of the other touch detection electrodes TDL. Accordingly, compared with the detection sensitivity in regions corresponding to the other touch detection electrode TDL, lowering of the detection sensitivity in a region corresponding to the outermost touch detection electrode TDL may be suppressed to the minimum. Moreover, as illustrated in FIG. 4, the touch detection electrodes TDL are arranged side by side throughout the effective display region S so that the detection sensitivity with respect to touch events may be uniform in the effective display region S.

The touch detection circuit connected to the touch detection electrodes TDL through the FPC 5 detects touch events based on the touch detection signal Vdet. The touch detection circuit typically performs correction operation based on the supplied touch detection signal Vdet so that the detection sensitivity with respect to touch events becomes uniform in the effective display region S, and determines touched positions and the like, based on the operation result. In the display device with a touch detection function 1, as described above, since the touch detection electrodes TDL are lengthened to improve the uniformity of the detection sensitivity, the correction amount by the correction operation in the touch detection circuit may be reduced and thus, for example, the touched position may be detected with increased accuracy.

(Effects)

As described above, in the embodiment, the common electrodes are further extended from the center of the outermost touch detection electrode by a length corresponding to a length equal to more than half of the electrode pitch of the touch detection electrodes. Therefore, the detection sensitivity in a region corresponding to the outermost touch detection electrode may be equal to that in a region corresponding to the inner touch detection electrode.

Moreover, in the embodiment, since the touch detection electrodes are arranged side by side throughout the effective display region, the uniformity in the detection sensitivity may be improved in the effective display region. Accordingly, the correction amount by the correction operation in the touch detection circuit may be reduced and thus, for example, the touched positions may be detected with increased accuracy.

[Modification 1]

In the above-described embodiment, the common electrodes COML and the touch detection electrodes TDL are respectively arranged side by side throughout the effective display region S. However, the technology is not limited thereto, and alternatively, for example, the common electrodes COML and/or the touch detection electrodes TDL may be arranged side by side out of the effective display region S as well. An example of a case where both the common electrodes COML and the touch detection electrodes TDL are respectively arranged side by side out of the effective display region S will be described below.

Figure 9:
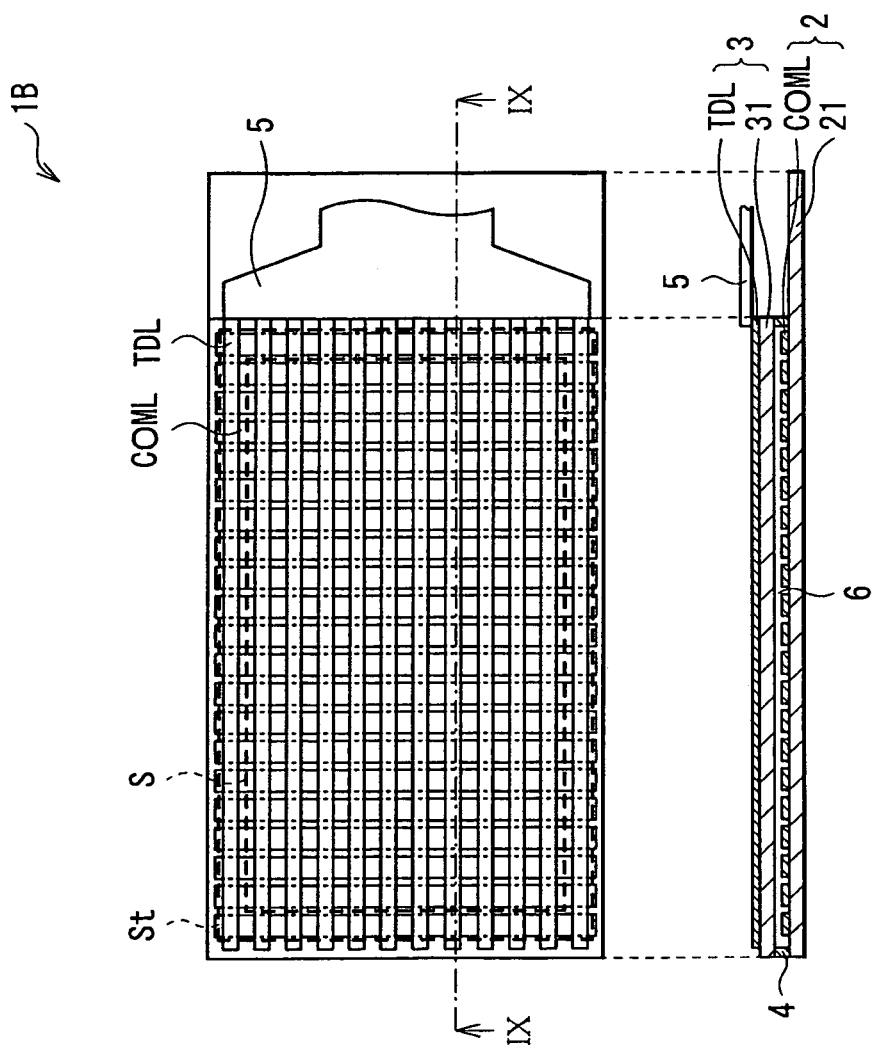
FIG. 9 is a plane view and a sectional view illustrating a configuration example of a display device with a touch detection function according to a modification of the first embodiment.

FIG. 9 illustrates a configuration example of a display device with a touch detection function 1B according to a modification 1. As illustrated in FIG. 9, the common electrodes COML are arranged side by side also out of the effective display region S (a right end and a left end in FIG. 9) as well. The touch detection electrodes TDL are also arranged side by side out of the effective display region S (an upper end and a lower end in FIG. 9). In addition, the touch detection electrodes TDL are formed to extend to a position corresponding to the outermost common electrode COML out of the effective display region S (the left end in FIG. 9). Accordingly, in the display device with a touch detection function 1B, the detection sensitivity is allowed to be uniform in the effective display region S, and a touch detection region St is allowed to be larger than the effective display region S.

3. Second Embodiment

Next, a display device with a touch detection function 7 according to a second embodiment of the disclosure will be described. In the second embodiment, the electrode pitch d (an arrangement pitch) of the touch detection electrodes is varied depending on a position in the effective display region S. Other configurations are the same as those in the first embodiment (FIG. 4). Note that like numerals are used to designate substantially like components of the display device with a touch detection function 1 according to the first embodiment, and the description thereof is appropriately omitted.

Figure 10:
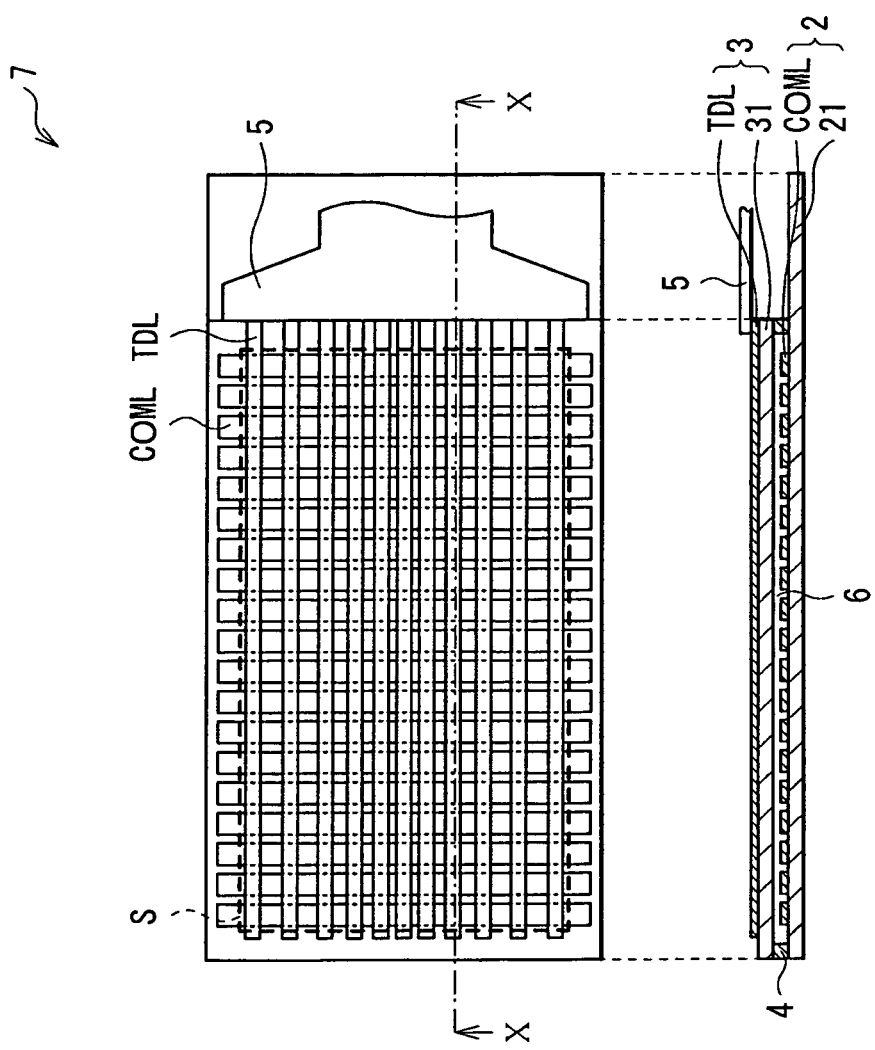
FIG. 10 is a plane view and a sectional view illustrating a configuration example of a display device with a touch detection function according to a second embodiment of the disclosure.

FIG. 10 illustrates a configuration example of the display device with a touch detection function 7. In the display device with a touch detection function 7, the touch detection electrodes TDL are arranged side by side so that the electrode pitches d are varied depending on a position as illustrated in FIG. 10. Specifically, in a direction intersecting with the extending direction of the touch detection electrodes TDL, the touch detection electrodes TDL are arranged so that the electrode pitch d is narrow near the center of the effective display region S and is wide near the ends of the effective display region S. Note that the arrangement of the touch detection electrodes TDL is not limited thereto. For example, the touch detection electrodes TDL may be arranged so that only the electrode pitch d relating to the outermost touch detection electrode TDL is wide in a direction intersecting with the extending direction of the touch detection electrodes TDL.

Figure 11:
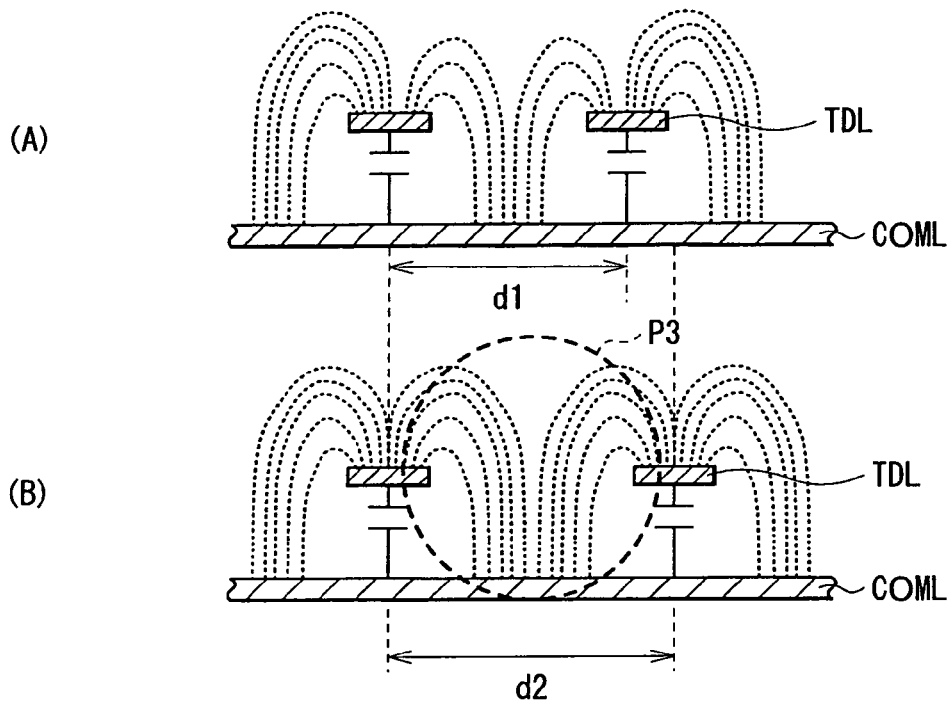
FIG. 11 is a schematic diagram illustrating a change in lines of electric force due to fringes at the time of changing an electrode pitch.

FIG. 11 schematically illustrates a change in lines of electric force due to fringes when the electrode pitch d between the touch detection electrodes TDL is changed, where (A) illustrates a case of the electrode pitch d being narrow (an electrode pitch d1), and (B) illustrates a case of the electrode pitch d being wide (an electrode pitch d2). FIG. 11 illustrates a case where only two touch detection electrodes TDL are arranged side by side for convenience of description. As illustrated in FIG. 11, the wide electrode pitch d leads to an increase of the number of lines of electric force due to fringes (in a portion P3). Consequently, the detection sensitivity in a region corresponding to the touch detection electrodes TDL with increased lines of electric force may be increased.

Figure 12:
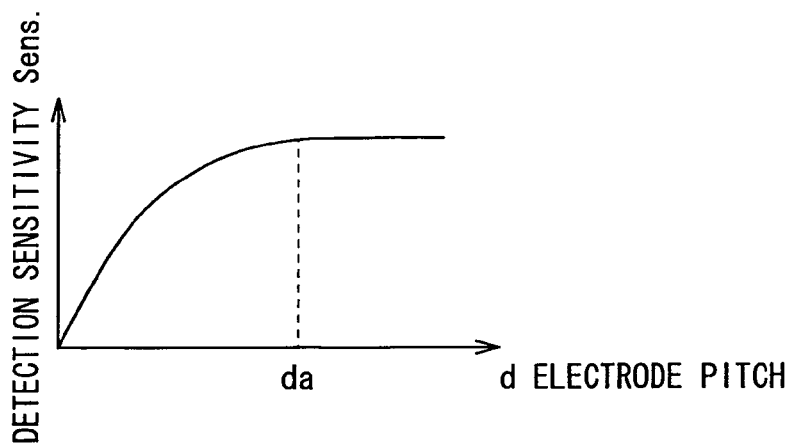
FIG. 12 is a characteristic diagram illustrating a relationship between the electrode pitch and detection sensitivity.

FIG. 12 illustrates a simulation result of a relationship between the electrode pitch d and detection sensitivity Sens. When the electrode pitch d is equal to or smaller than a certain value (an electrode pitch da), as illustrated in FIG. 12, the detection sensitivity Sens is increased with an increase in the electrode pitch d. In this case, for example, when the electrode width w of each of the touch detection electrodes TDL is 1 mm, the electrode pitch da is approximately 3 mm. In this way, the detection sensitivity Sens may be adjusted by changing the electrode pitch d within a range of electrode pitch d<da.

As illustrated in FIG. 10, in the display device with a touch detection function 7, the touch detection electrodes TDL are arranged so that the electrode pitch d is narrow near the center of the effective display region S and is wide near the ends of the effective display region S. Accordingly, for example, in the case of forming the touch detection electrodes TDL with a fixed electrode pitch d, when the detection sensitivity Sens becomes low near the ends of the effective display region S, the detection sensitivity Sens in a region corresponding to the touch detection electrode TDL may be increased by widening the electrode pitch d of the touch detection electrodes TDL arranged near the ends, and therefore the detection sensitivity Sens is allowed to be uniform in the effective display region S.

Incidentally, in the display device with a touch detection function 7, since the electrode pitch d of the touch detection electrodes TDL varies depending on a position, the touch detection circuit needs to perform coordinate interpolation taking into account the electrode arrangement to determine the touched position.

As described above, in the second embodiment, the electrode pitch of the touch detection electrodes is set to vary depending on the position. Therefore, the detection sensitivity is allowed to be freely set in a direction intersecting with the touch detection electrodes.

Moreover, in the embodiment, the electrode pitch of the touch detection electrodes arranged in an outer region is set to be equal to or larger than that in an inner region, within the effective display region. Therefore, the uniformity in the detection sensitivity in the effective display region may be improved. In addition, the correction amount by the correction operation in the touch detection circuit may be accordingly reduced and thus, for example, the touched position may be detected with increased accuracy.

The other effects are the same as those in the case of the first embodiment.

4. Third Embodiment

Subsequently, a display device with a touch detection function 8 according to a third embodiment of the disclosure will be described. In the third embodiment, the electrode width of each of the touch detection electrodes is varied depending on a position in the effective display region S. The other configurations are the same as those in the first embodiment (FIG. 4). Note that like numerals are used to designate substantially like components of the display device with a touch detection function 1 according to the first embodiment, and the description thereof is appropriately omitted.

Figure 13:
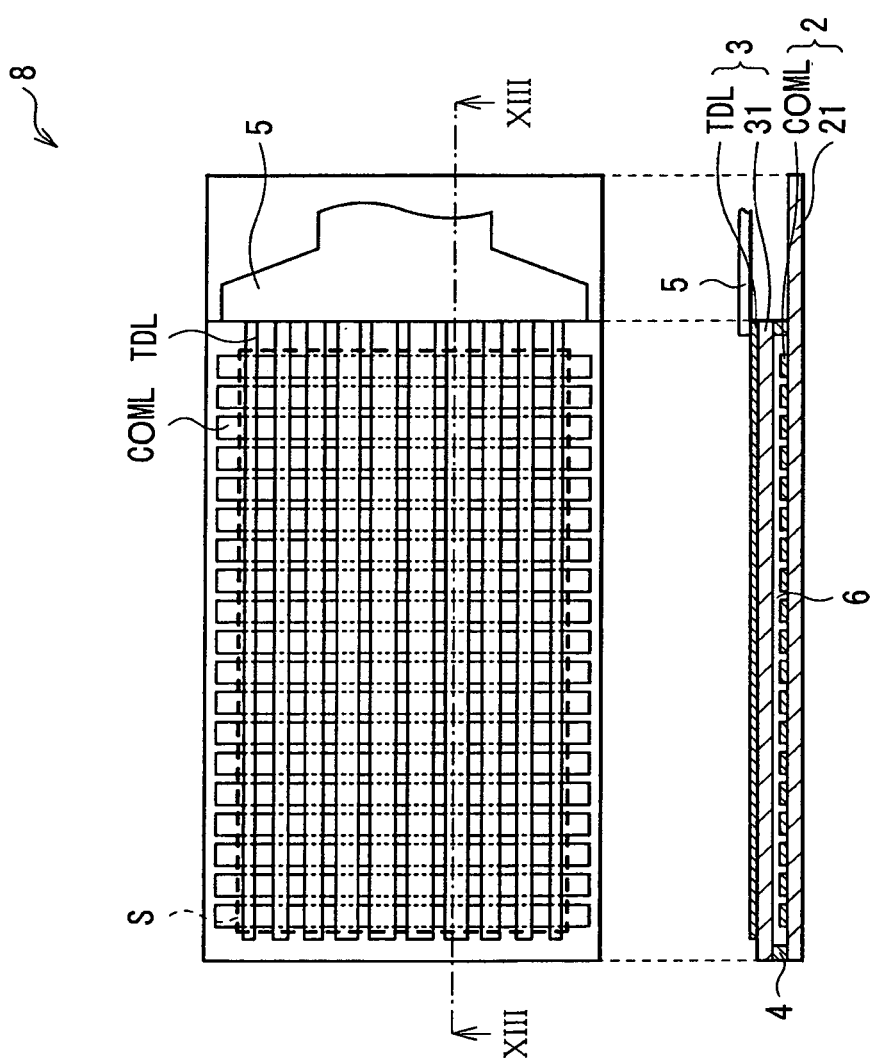
FIG. 13 is a plane view and a sectional view illustrating a configuration example of a display device with a touch detection function according to a third embodiment of the disclosure.

FIG. 13 illustrates a configuration example of the display device with a touch detection function 8. In the display device with a touch detection function 8, the touch detection electrodes TDL are formed so that the electrode width w varies depending on a position as illustrated in FIG. 13. Specifically, in a direction intersecting with the extending direction of the touch detection electrodes TDL, the touch detection electrodes TDL are formed so that the touch detection electrode TDL closer to the center of the effective display region S have the wider electrode width w and the touch detection electrode closer to the ends of the effective display region S have the narrower electrode width w. Note that the width of each of the touch detection electrodes TDL is not limited thereto, and for example, the touch detection electrodes TDL may be formed so that only the outermost touch detection electrode TDL has a narrow electrode width w in a direction intersecting with the extending direction of the touch detection electrodes TDL.

Figure 14:
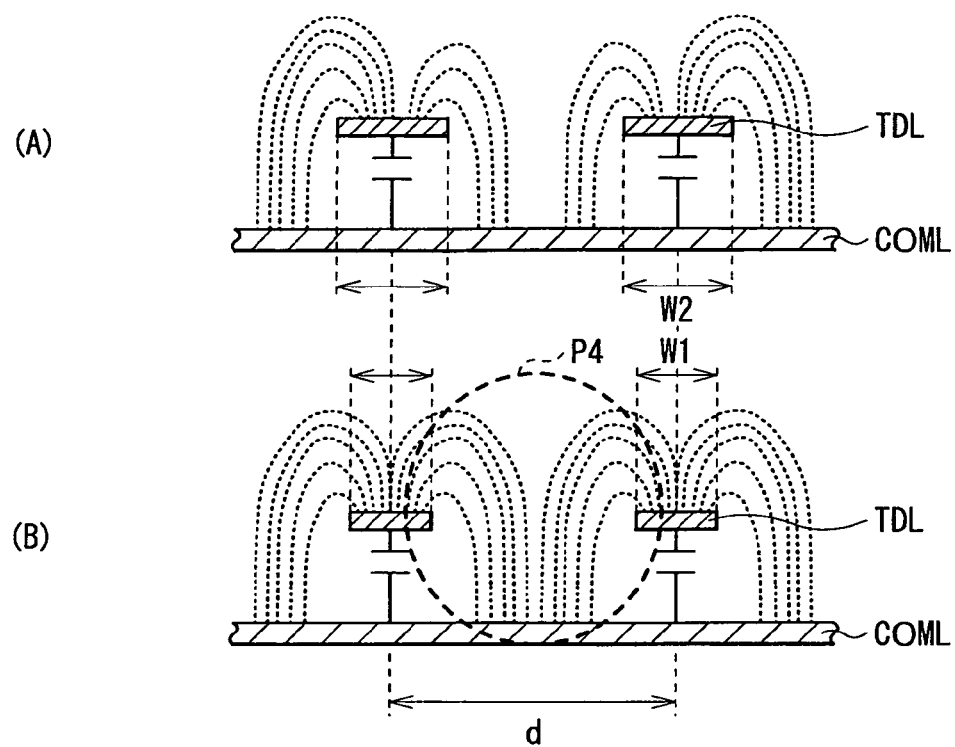
FIG. 14 is a schematic diagram illustrating a change in lines of electric force due to fringes at the time of changing an electrode width.

FIG. 14 schematically illustrates a change in the lines of electric force due to fringes when the electrode width w of each of the touch detection electrodes TDL is changed, where (A) illustrates a case of the electrode width w being wide (an electrode width w2), and (B) illustrates a case of the electrode width w being narrow (an electrode width w1). FIG. 14 illustrates a case where only two touch detection electrodes TDL are arranged side by side for convenience of description. As illustrated in FIG. 14, when the electrode width w is narrowed, the number of the lines of electric force is increased (in a portion P4). Accordingly, the detection sensitivity in a region corresponding to the touch detection electrode TDL with increased lines of electric force may be increased.

Figure 15:
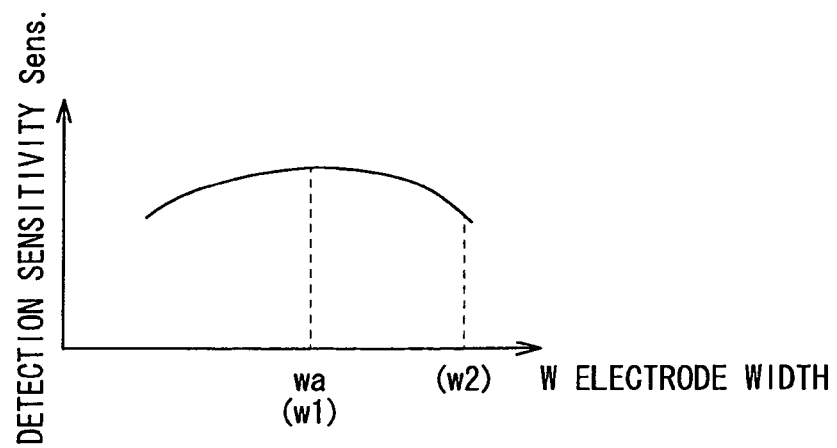
FIG. 15 is a characteristic diagram illustrating a relationship between the electrode width and detection sensitivity.

FIG. 15 illustrates a simulation result of a relationship between the electrode width w and the detection sensitivity Sens. As illustrated in FIG. 15, the detection sensitivity Sens is highest at a certain electrode width wa, and is gradually decreased with increasing or decreasing the electrode width from the electrode width wa. In this case, for example, when the electrode pitch d of the touch detection electrodes TDL is 5 mm, the electrode width wa is approximately 1 mm. In the right side of FIG. 15, lowering of the detection sensitivity Sens when the electrode width w becomes larger than the electrode width wa is caused by the decrease in the lines of electric force due to fringes with increasing electrode width w, as described above. On the other hand, as illustrated in the left side of FIG. 15, when the electrode width w becomes narrower than the electrode width wa, the detection sensitivity Sens is lowered. This is because the resistance value of the touch detection electrodes TDL becomes larger and the time constant is increased with decreasing the electrode width w, and therefore the touch detection signal Vdet is difficult to be transmitted to the touch detection circuit through the touch detection electrodes TDL. In this way, the detection sensitivity Sens may be adjusted by changing the electrode width w.

As illustrated in FIG. 13, in the display device with a touch detection function 8, the touch detection electrodes TDL are arranged so that the touch detection electrodes TDL closer to the center of the effective display region S have the wider electrode width w and the touch detection electrodes TDL closer to the ends of the effective display region S have the narrower electrode width w. Accordingly, for example, as illustrated in FIG. 15, in the case of forming the touch detection electrodes TDL with the wide electrode width w2 constant within the effective display region S, when the detection sensitivity Sens is lowered near the ends of the effective display region S, by narrowing the electrode width w similarly to the electrode width w1 of the touch detection electrodes TDL arranged near the ends, the detection sensitivity Sens in a region corresponding to the touch detection electrode TDL may be increased, and therefore the detection sensitivity Sens is allowed to be uniform in the effective display region S.

As described above, in the third embodiment, the touch detection electrodes are formed to have electrode widths different from one another. Therefore, the detection sensitivity is allowed to be freely set in a direction intersecting with the touch detection electrodes.

Moreover, in the embodiment, the width of the touch detection electrode in an outer region is set to be equal to or smaller than that in an inner region, within the effective display region. Therefore, the uniformity in the detection sensitivity in the effective display region may be improved. In addition, the correction amount by the correction operation in the touch detection circuit may be accordingly reduced and thus, for example, the touched position may be detected with increased accuracy.

The other effects are the same as those in the case of the first embodiment.

5. Fourth Embodiment

Next, a display device with a touch detection function 9 according to a fourth embodiment of the disclosure will be described. In the fourth embodiment, the thickness of the surface glass plate varies depending on a position in the effective display region S. The other configurations are the same as those in the first embodiment (FIG. 4). Note that like numerals are used to designate substantially like components of the display device with a touch detection function 1 according to the first embodiment, and the description thereof is appropriately omitted.

Figure 16:
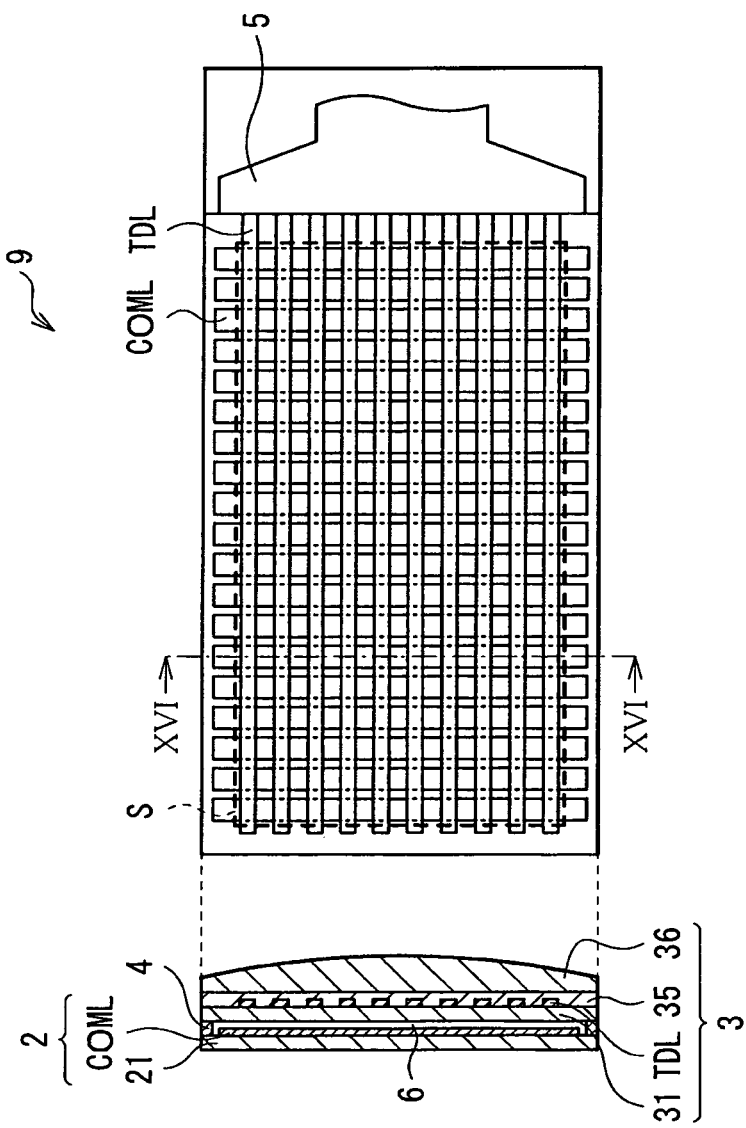
FIG. 16 is a plane view and a sectional view illustrating a configuration example of a display device with a touch detection function according to a fourth embodiment of the disclosure.

FIG. 16 illustrates a configuration example of the display device with a touch detection function 9. In the display device with a touch detection function 9, a surface glass plate 36 is formed to have the thickness varied depending on a position as illustrated in FIG. 16. Specifically, the surface glass plate 36 is formed so that the thickness becomes thicker toward the center of the effective display region S and the thickness becomes thinner toward the ends of the effective display region S, in a direction intersecting with the extending direction of the touch detection electrodes TDL.

Figure 17A:
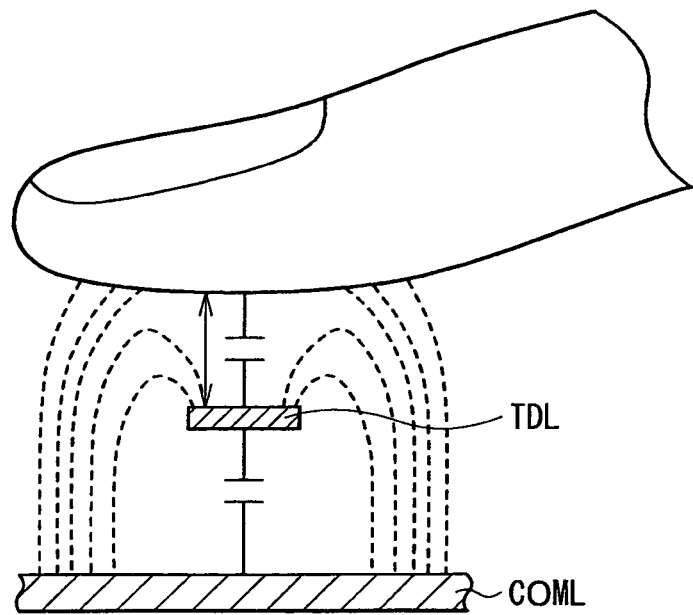
FIGS. 17A and 17B are schematic diagrams illustrating a change in lines of electric force due to fringes at the time of changing a thickness of a surface glass plate.
Figure 17B:
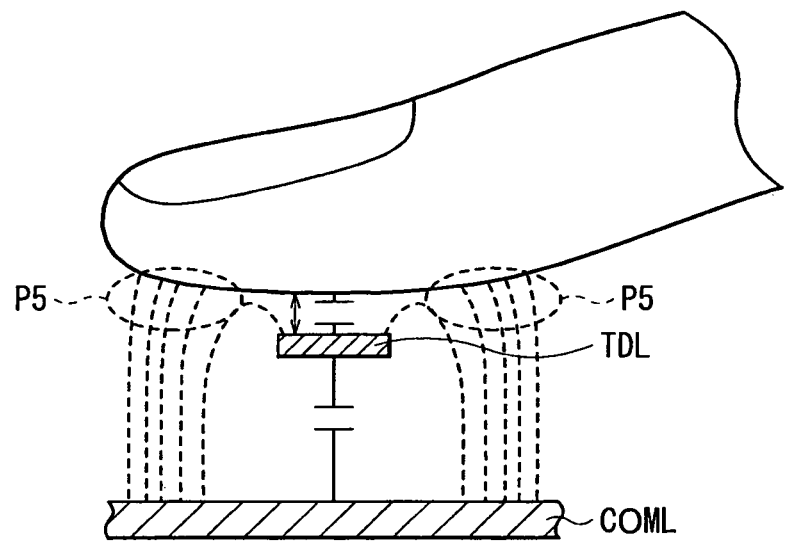

FIG. 17 schematically illustrates a change in the lines of electric force due to fringes when the thickness of the surface glass plate 36 is changed, where (A) illustrates a case of the surface glass plate 36 being thick, and (B) illustrates a case of the surface glass plate 36 being thin. As illustrated in FIG. 17, in the case of the surface glass plate 36 being thin, when a finger or the like touches the plate, the finger blocks the large number of the lines of electric force due to fringes (in a portion P5). Accordingly, the detection sensitivity with respect to touch events in a region corresponding to the touch detection electrode TDL with the lines of electric force blocked may be increased.

As illustrated in FIG. 16, in the display device with a touch detection function 9, the surface glass plate 36 is formed thick near the center of the effective display region S, and is formed thin near the ends of the effective display region S. Accordingly, for example, in a case where the surface glass plate 36 is formed to have a thickness constant within the effective display region S, when the detection sensitivity Sens is lowered near the ends of the effective display region S, by reducing the thickness of the surface glass plate 36 near the ends, the detection sensitivity Sens in that portion may be increased, and the detection sensitivity Sens is allowed to be uniform in the effective display region S.

As described above, in the fourth embodiment, the thickness of the surface glass plate is set to vary depending on the position. Therefore, the detection sensitivity is allowed to be freely set.

Moreover, in the embodiment, in a direction intersecting with the touch detection electrodes, the thickness of the surface glass plate in an outer region within the effective display region is set to be equal to or smaller than that in an inner region so that the uniformity in the detection sensitivity in the effective display region may be improved. In addition, the correction amount by the correction operation in the touch detection circuit may be accordingly reduced and thus, for example, the touched position may be detected with increased accuracy.

The other effects are the same as those in the case of the first embodiment.

Hereinbefore, although the embodiments have been described with the display device with a touch detection function as an example, the technology is not limited thereto, and for example, the technology may be implemented by a single touch detection device. An example in such a case will be described below.

6. Fifth Embodiment

Next, a touch detection device 17 according to a fifth embodiment of the disclosure will be described. In the fifth embodiment, the relevant part of the display device with a touch detection function 7 according to the second embodiment is applied to a single touch detection device, and the electrode pitch d of the touch detection electrodes varies depending on a position. Note that like numerals are used to designate substantially like components of the display device with a touch detection function 7 according to the second embodiment (FIG. 10), and the description thereof is appropriately omitted.

Figure 18:
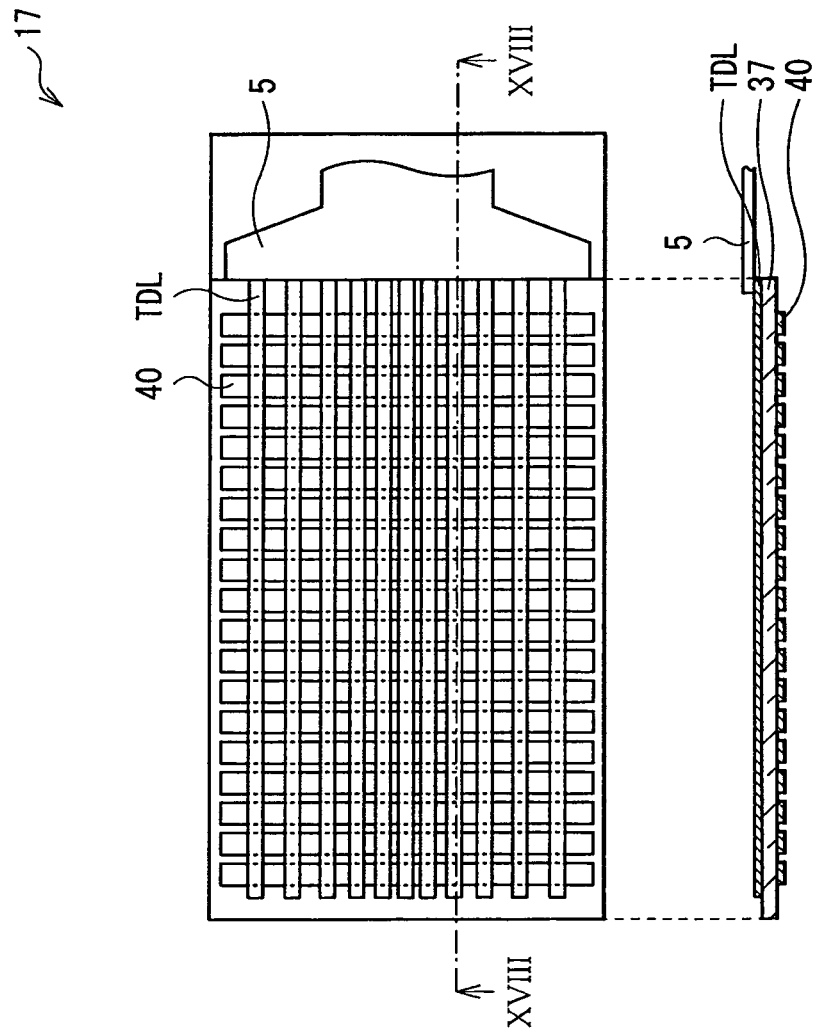
FIG. 18 is a plane view and a sectional view illustrating a configuration example of a touch detection device according to a fifth embodiment of the disclosure.

FIG. 18 illustrates a configuration example of the touch detection device 17. The touch detection device 17 includes a glass substrate 37 and drive electrodes 40. The drive electrodes 40 correspond to the drive electrode E1 in the above-described basic principle of the electrostatic capacitance type touch detection, and correspond to the common electrodes COML in the second embodiment and the like. The drive electrodes 40 are arranged side by side on a surface of the glass substrate 37, and on the other surface, the touch detection electrodes TDL are arranged side by side in a direction intersecting with the drive electrodes 40. Similar to the case of the display device with a touch detection function 7 according to the second embodiment, the touch detection electrodes TDL are arranged side by side so that the electrode pitch d varies. Specifically, in a direction intersecting with the extending direction of the touch detection electrodes TDL, the touch detection electrodes TDL are arranged so that the electrode pitch d is narrow near the center of the touch detection device 17 and is wide near the ends of the touch detection device 17. Accordingly, the detection sensitivity Sens with respect to touch events may be uniform similarly to the case of the second embodiment.

As described above, in the fifth embodiment, the electrode pitch of the touch detection electrodes is set to vary. Therefore, the detection sensitivity is allowed to be freely set in a direction intersecting with the touch detection electrodes.

Moreover, in the embodiment, the electrode pitch of the touch detection electrodes in an outer region is set to be equal to or larger than that in an inner region. Therefore, the uniformity in the detection sensitivity may be improved. In addition, the correction amount by the correction operation in the touch detection circuit may be accordingly reduced and thus, for example, the touched position may be detected with increased accuracy.

7. Sixth Embodiment

Subsequently, a touch detection device 18 according to a sixth embodiment of the disclosure will be described. In the sixth embodiment, the relevant part of the display device with a touch detection function 8 according to the third embodiment is applied to a single touch detection device, and the electrode width w of each of the touch detection electrode is varied depending on a position. Note that like numerals are used to designate substantially like components of the display device with a touch detection function 8 according to the third embodiment, and the description thereof is appropriately omitted.

Figure 19:
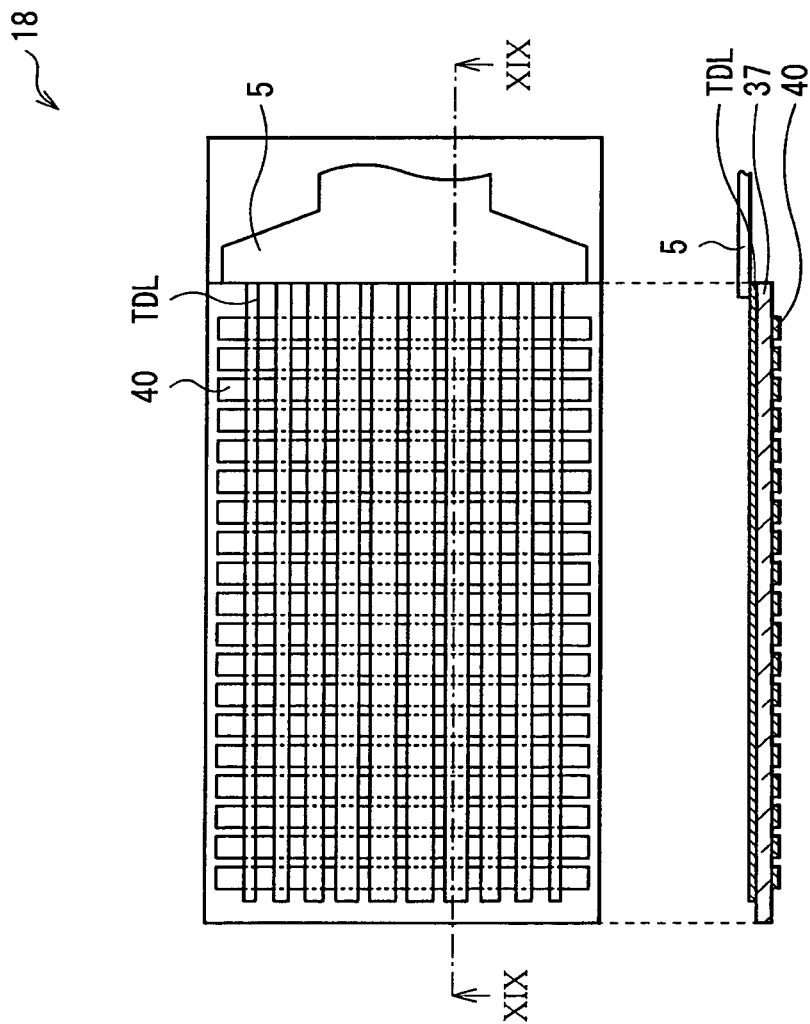
FIG. 19 is a plane view and a sectional view illustrating a configuration example of a touch detection device according to a sixth embodiment of the disclosure.

FIG. 19 illustrates a configuration example of the touch detection device 18. Similar to the case of the display device with a touch detection function 8 according to the third embodiment, the touch detection electrodes TDL are formed so that the electrode width w varies depending on the position. Specifically, in a direction intersecting with the extending direction of the touch detection electrodes TDL, the touch detection electrodes TDL are formed so that the touch detection electrode TDL close to the center of the touch detection device 18 have the wider electrode width w and the touch detection electrode close to the ends of the touch detection device 18 have the narrower electrode width w. Accordingly, the detection sensitivity Sens with respect to touch events may be uniform similarly to the case of the third embodiment.

As described above, in the sixth embodiment, the touch detection electrodes are formed to have different widths from one another. Therefore, the detection sensitivity is allowed to be freely set in a direction intersecting with the touch detection electrodes.

Moreover, in the embodiment, the electrode width of the touch detection electrode in an outer region is set to be equal to or smaller than that in an inner region. Therefore, the uniformity in the detection sensitivity may be improved. In addition, the correction amount by the correction operation in the touch detection circuit may be accordingly reduced and thus, for example, the touched position may be detected with increased accuracy.

8. Seventh Embodiment

Next, a touch detection device 19 according to a seventh embodiment of the disclosure will be described. In the seventh embodiment, the relevant part of the display device with a touch detection function 9 according to the fourth embodiment is applied to a single touch detection device, and the thickness of the surface glass plate varies depending on a position. Note that like numerals are used to designate substantially like components of the display device with a touch detection function 9 according to the fourth embodiment, and the description thereof is appropriately omitted.

Figure 20:
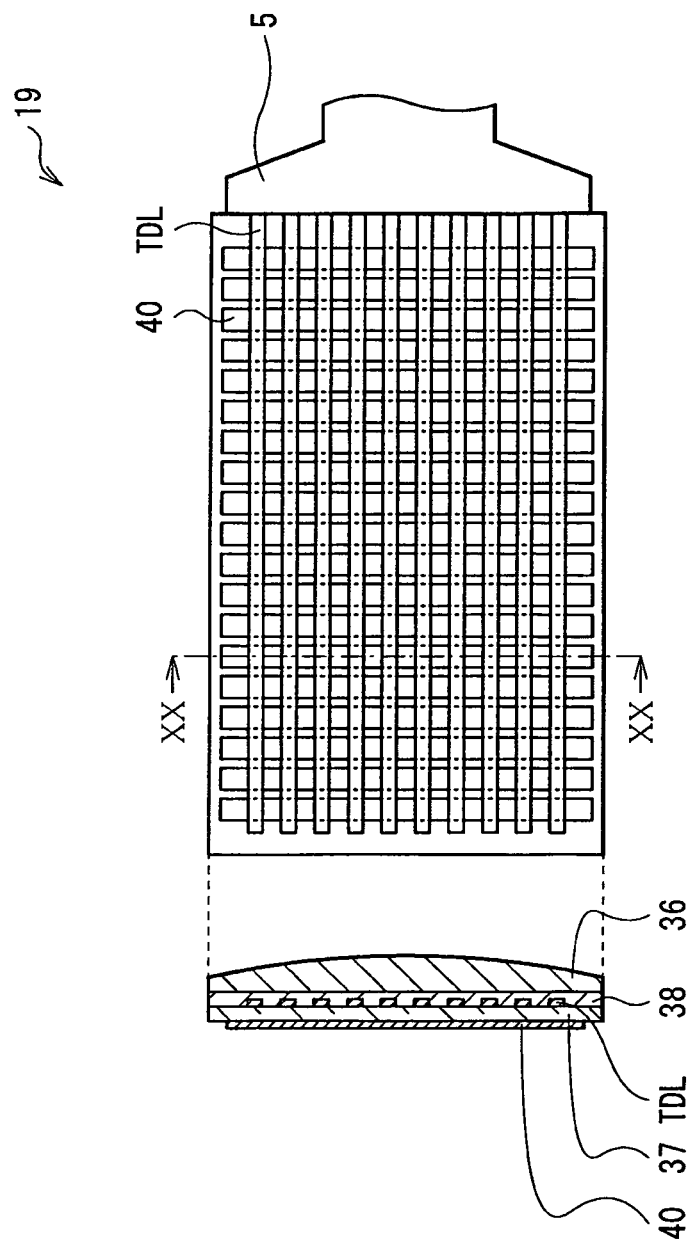
FIG. 20 is a plane view and a sectional view illustrating a configuration example of a touch detection device according to a seventh embodiment of the disclosure.

FIG. 20 illustrates a configuration example of the touch detection device 19. The touch detection device 19 includes a planarizing layer 38. For example, an insulating layer, a protection film, or a polarizing plate may be used as the planarizing layer 38. The planarizing layer 38 is formed on a surface provided with the touch detection electrodes TDL of the glass substrate 37, and the surface glass plate 36 is disposed on the planarizing layer 38. The surface glass plate 36 is formed to have a thickness varied depending on a position, similar to the case of the display device with a touch detection function 9 according to the fourth embodiment. Specifically, the surface glass plate 36 is formed to be thicker close to the center of the touch detection device 19, and to be thinner close to the ends of the touch detection device 19, in a direction intersecting with the extending direction of the touch detection electrodes TDL. Accordingly, the detection sensitivity with respect to touch events may be uniform similarly to the case of the fourth embodiment.

As described above, in the seventh embodiment, the thickness of the surface glass plate is set to vary depending on the position. Therefore, the detection sensitivity is allowed to be freely set.

Moreover, in the embodiment, in a direction intersecting with the touch detection electrodes, the thickness of the surface glass plate in an outer region is equal to or smaller than that in an inner region so that the uniformity in the detection sensitivity may be improved. In addition, the correction amount by the correction operation in the touch detection circuit may be accordingly reduced and thus, for example, the touched position may be detected with increased accuracy.

9. Application Examples

Next, application examples of the display devices with a touch detection function and the touch detection devices described in the embodiments and modifications will be described with reference to FIG. 21 to FIG. 25G. The display devices with a touch detection function and the like of the above-described embodiments and the like are applicable to electronic units in any fields, such as a television device, a digital camera, a notebook personal computer, a portable terminal device such as a mobile phone, and a video camera. In other words, the display devices with a touch detection function and the like of the above-described embodiments and the like are applicable to electronic units in various fields for displaying a picture signal input from the outside or a picture signal internally generated as an image or a picture.

Application Example 1

Figure 21:
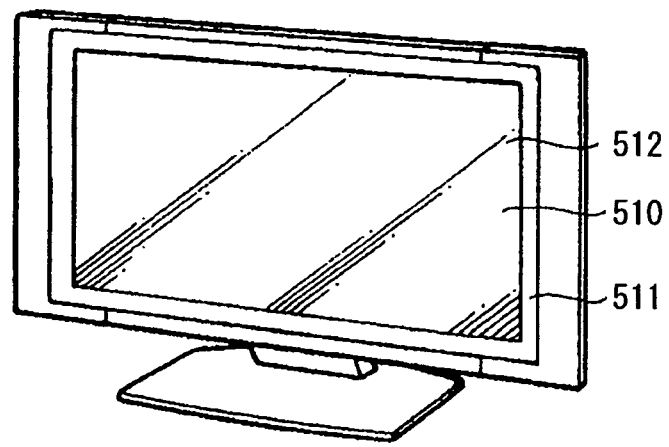
FIG. 21 is a perspective view illustrating an appearance configuration of an application example 1, out of display devices with a touch detection function and the like, applied with any of the embodiments.

FIG. 21 illustrates an appearance of a television device to which the display device with a touch detection function or the like of the above-described embodiments and the like is applied. The television device has, for example, a picture display screen section 510 including a front panel 511 and a filter glass 512. The picture display screen section 510 is configured of the display device with a touch detection function or the like according to the above-described embodiments and the like.

Application Example 2

Figure 22A:
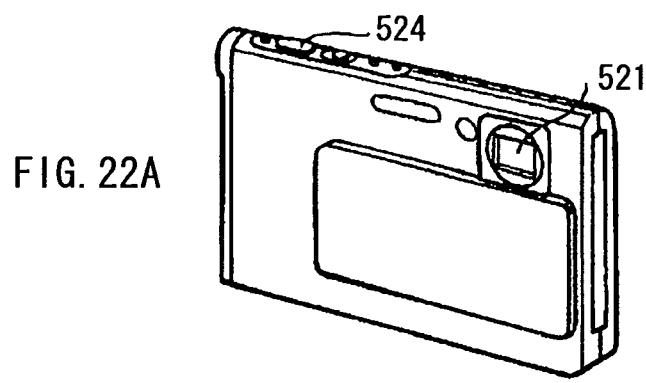
FIGS. 22A and 22B are perspective views illustrating an appearance configuration of an application example 2.
Figure 22B:
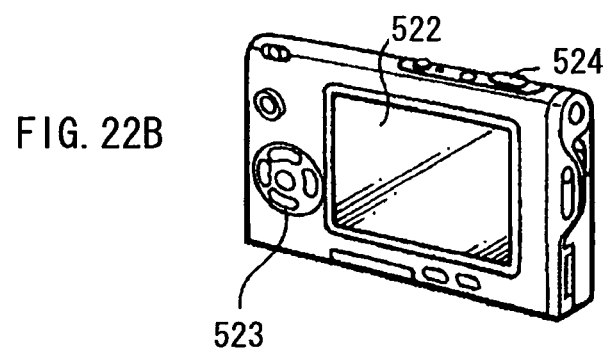

FIGS. 22A and 22B illustrate an appearance of a digital camera to which the display device with a touch detection function or the like of the above-described embodiments and the like is applied. The digital camera has, for example, a light emitting section for a flash 521, a display section 522, a menu switch 523, and a shutter button 524. The display section 522 is configured of the display device with a touch detection function or the like according to the above-described embodiments and the like.

Application Example 3

Figure 23:
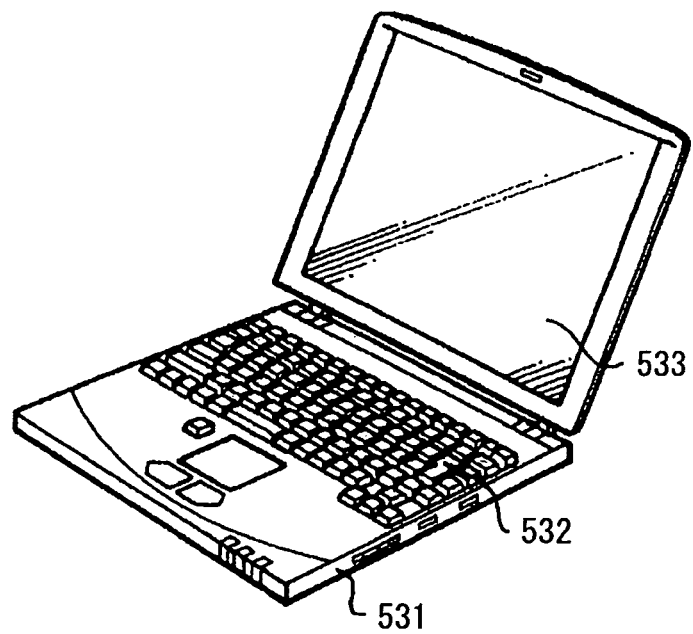
FIG. 23 is a perspective view illustrating an appearance configuration of an application example 3.

FIG. 23 illustrates an appearance of a notebook personal computer to which the display device with a touch detection function or the like of the above-described embodiments and the like is applied. The notebook personal computer has, for example, a main body 531, a keyboard 532 for operation of inputting characters and the like, and a display section 533 for displaying an image. The display section 533 is configured of the display device with a touch detection function or the like according to the above-described embodiments and the like.

Application Example 4

Figure 24:
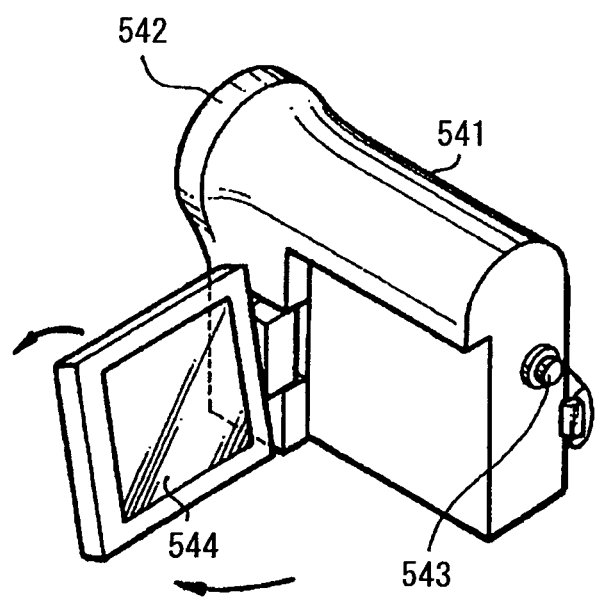
FIG. 24 is a perspective view illustrating an appearance configuration of an application example 4.
Figure 25:
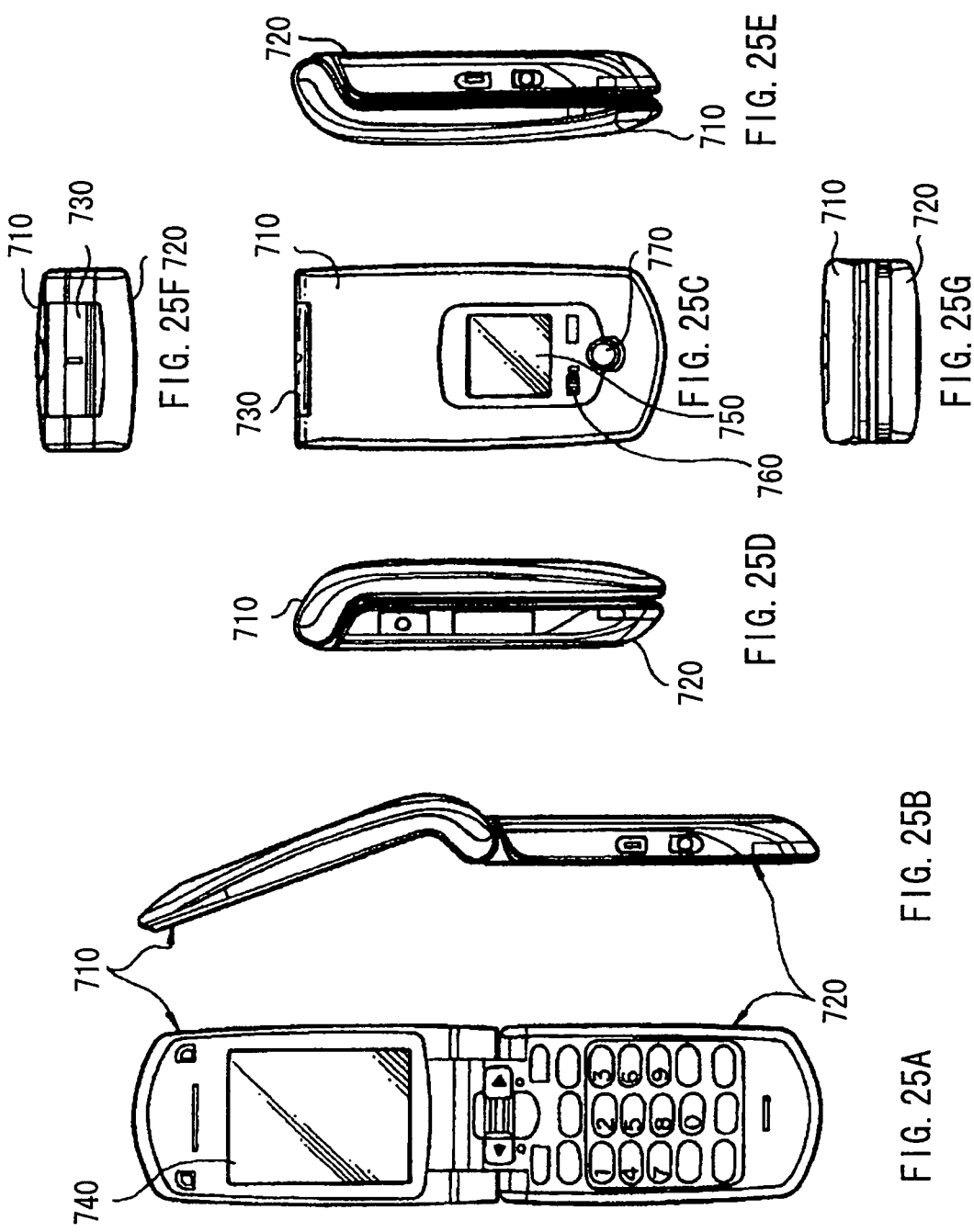
FIGS. 25A to 25G are front views, side views, a top view, and a bottom view illustrating an appearance configuration of an application example 5.

FIG. 24 illustrates an appearance of a video camera to which the display device with a touch detection function or the like of the above-described embodiments and the like is applied. The video camera has, for example, a main body 541, a lens 542 for shooting an object provided on the front side face of the main body 541, a shooting start/stop switch 543, and a display section 544. Also, the display section 544 is configured of the display device with a touch detection function or the like according to the above-described embodiments and the like.

Application Example 5

FIGS. 25A to 25G illustrate an appearance of a mobile phone to which the display device with a touch detection function or the like of the above-described embodiments and the like is applied. In the mobile phone, for example, a top-side enclosure 710 and a bottom-side enclosure 720 are joined by a joint section (a hinge section) 730. The mobile phone has a display 740, a sub-display 750, a picture light 760, and a camera 770. The display 740 or the sub-display 750 is configured of the display device with a touch detection function or the like according to the above-described embodiments and the like.

Hereinbefore, although the technology has been described with referring to the several embodiments, modifications, and application examples to the electronic units, the technology is not limited thereto, and various modifications may be made.

Figure 26:
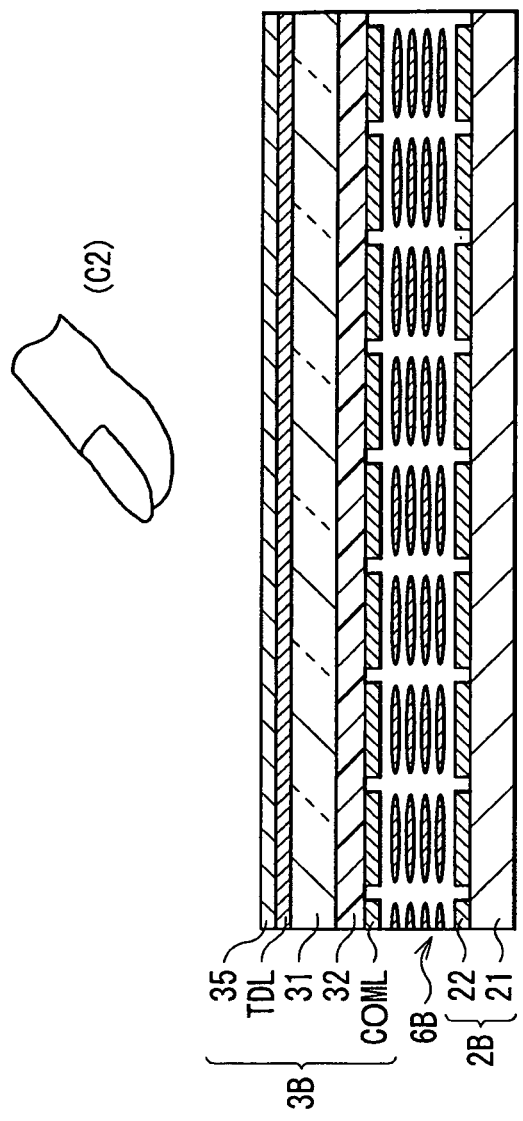

For example, in the first to fourth embodiments and the like, the touch detection section and the liquid crystal display section using a liquid crystal of lateral electric field mode such as FFS or IPS are integrated. Alternatively, a touch detection section and a liquid crystal display section using a liquid crystal of various modes such as TN (twisted nematic), VA (vertical alignment), and ECB (electrically controlled birefringence) may be integrated. In a case where such a liquid crystal is used, a display device with a touch detection function may be configured as illustrated in FIG. 26. FIG. 26 illustrates an example of a cross-sectional configuration of a relevant part of a display device with a touch detection function according to the modification, and illustrates a state where a liquid crystal layer 6B is sandwiched between a pixel substrate 2B and a facing substrate 3B. Since names, functions, and the like of the other parts are the same as in the case of FIG. 5, the description thereof is omitted. In this example, unlike the case of FIG. 5, the common electrodes COML commonly used for display and for touch detection are formed on the facing substrate 3B.

Moreover, for example, the display devices with a touch detection function 7 to 9 according to the second to fourth embodiments may be combined. Specifically, for example, both the electrode pitch d and the electrode width w of the touch detection electrodes TDL may be varied in the effective display region S. Alternatively, the electrode pitch d of the touch detection electrodes TDL is varied in the effective display region S, and the thickness of the surface glass plate may be varied depending on a position. Still alternatively, the electrode width w of the touch detection electrodes TDL is varied, and the thickness of the surface glass plate may be varied depending on a position. In addition, for example, both the electrode pitch d and the electrode width w of the touch detection electrodes TDL are varied in the effective display region S, and the thickness of the surface glass plate may be varied depending on a position. Likewise, the touch detection devices 17 to 19 according to the fifth to seventh embodiments may be combined.

The present application contains subject matter related to that disclosed in Japanese Priority Patent Application JP 2010-217579 filed in the Japan Patent Office on Sep. 28, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device with a touch detection function comprising:
    a display function layer;
    a plurality of touch detection electrodes arranged side by side to extend in a first direction; and
    a plurality of drive electrodes arranged side by side to extend in a second direction intersecting with the first direction, electrostatic capacitance being formed at intersections of the touch detection electrodes and the drive electrodes, wherein
    the plurality of drive electrodes extends to a first position or a second position outside of the first position, the first position being away from a center of an outermost touch detection electrode by a distance longer than a half length of a distance between the center of the outermost touch detection electrode and a center of a touch detection electrode adjacent thereto within an effective display region of the display function layer, the outermost touch detection electrode being defined as outermost one of touch detection electrodes included in the effective display region of the display function layer, and
    an outer edge of the effective display region is located on or inside the first position.

2. The display device according to claim 1, wherein the plurality of drive electrodes include one or more drive electrodes arranged side by side outside the effective display region in the first direction as well.

3. The display device according to claim 1, wherein the plurality of touch detection electrodes include one or more touch detection electrodes arranged side by side outside the effective display region in the second direction as well, and extend to at least a third position located outside an outermost drive electrode.

4. The display device according to claim 1, wherein
    the plurality of touch detection electrodes are formed to have a same electrode width, and
    the distance between the center of the outermost touch detection electrode and the center of the touch detection electrode adjacent thereto is larger than that between a center of an innermost touch detection electrode and a center of a touch detection electrode adjacent thereto, within the effective display region.

5. The display device according to claim 1, wherein
    the plurality of touch detection electrodes are arranged with a same arrangement pitch, and
    a width of the outermost touch detection electrode is smaller than that of an innermost touch detection electrode, within the effective display region.

6. The display device according to claim 1, further comprising an upper layer formed over the plurality of touch detection electrodes to cover at least the effective display region, wherein a thickness of the upper layer in an outer region in the second direction is smaller than that in a center of the effective display region in the second direction.

7. The display device according to claim 1, wherein the display function layer includes a liquid crystal display layer, a pixel electrode, and a common electrode.

8. The display device according to claim 7, wherein the common electrode is used as the drive electrode, as well.

9. The display device according to claim 7, wherein the common electrode is arranged on an opposite side of the pixel electrodes from the liquid crystal display layer, or is arranged between the liquid crystal display layer and the pixel electrode.

10. The display device according to claim 7, wherein the common electrode is arranged on an opposite side of the liquid crystal display layer from the pixel electrode.

11. A display device comprising:
a display function layer;
a plurality of touch detection electrodes; and
a plurality of drive electrodes forming electrostatic capacitance at intersections of the touch detection electrodes and the drive electrodes, wherein
the plurality of drive electrodes extend to a first position or an outside of the first position, the first position being away from a center of an outermost touch detection electrode by a distance longer than a half length of a distance between the center of the outermost touch detection electrode and a center of a touch detection electrode adjacent thereto within an effective display region of the display function layer, the outermost touch detection electrode being defined as outermost one of touch detection electrodes included in the effective display region of the display function layer.

12. The display device according to claim 11, wherein an outer edge of the effective display region is located on or inside the first position.

13. The display device according to claim 11, wherein the plurality of drive electrodes include one or more drive electrodes arranged side by side outside the effective display region as well.

14. The display device according to claim 11, wherein the plurality of touch detection electrodes include one or more touch detection electrodes arranged side by side outside the effective display region as well.

15. The display device according to claim 11, wherein the distance between the center of the outermost touch detection electrode and the center of the touch detection electrode adjacent thereto is larger than that between a center of an innermost touch detection electrode and a center of a touch detection electrode adjacent thereto.

16. The display device according to claim 11, wherein a width of the outermost touch detection electrode is smaller than that of an innermost touch detection electrode.

17. The display device according to claim 11, further comprising an upper layer formed over the plurality of touch detection electrodes to cover at least the effective display region, wherein a thickness of the upper layer in an outer region is equal to or smaller than that in an inner region.

18. An electronic unit including;
a display device with a touch detection function, and
a control section performing operation control with use of the display device with a touch detection function,
the display device comprising:
a display function layer;
a plurality of touch detection electrodes arranged side by side to extend in a first direction; and
a plurality of drive electrodes arranged side by side to extend in a second direction intersecting with the first direction, electrostatic capacitance being formed at intersections of the touch detection electrodes and the drive electrodes, wherein
the plurality of drive electrodes extend to a first position or a second position outside of the first position, the first position being away from a center of an outermost touch detection electrode by a distance longer than a half length of a distance between the center of the outermost touch detection electrode and a center of a touch detection electrode adjacent thereto within an effective display region of the display function layer, the outermost touch detection electrode being defined as outermost one of touch detection electrodes included in the effective display region of the display function layer, and
an outer edge of the effective display region is located on or inside the first position.

19. The electronic unit according to claim 18, wherein
the plurality of touch detection electrodes are formed to have a same electrode width, and
the distance between the center of the outermost touch detection electrode and the center of the touch detection electrode adjacent thereto is larger than that between a center of an innermost touch detection electrode and a center of a touch detection electrode adjacent thereto, within the effective display region.

20. The electronic unit according to claim 18, wherein
the plurality of touch detection electrodes are arranged with a same arrangement pitch, and
a width of the outermost touch detection electrode is smaller than that of an innermost touch detection electrode, within the effective display region.

21. The display device according to claim 1, wherein respective ones of the plurality of drive electrodes extend out of the effective display region.

22. The display device according to claim 1, wherein respective ones of the plurality of drive electrodes are formed as a stripe shape.

23. The display device according to claim 1, wherein a first layer in which respective ones of the plurality of drive electrodes are formed and a second layer in which respective ones of the plurality of touch detection electrodes are formed are distinct layers.

* * * * *